(12) United States Patent
Vong et al.

(10) Patent No.: US 9,380,345 B2
(45) Date of Patent: Jun. 28, 2016

(54) IMMERSIVE SCALING INTERACTIVE TELEVISION

(71) Applicant: Microsoft Technology Licensing, LLC, Redmond, WA (US)

(72) Inventors: William H Vong, Redmond, WA (US); Chao Wang, Seattle, WA (US); Jeremie Blehm, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/557,324

(22) Filed: Dec. 1, 2014

(65) Prior Publication Data

US 2016/0156983 A1 Jun. 2, 2016

(51) Int. Cl.
| | |
|---|---|
| *H04N 21/472* | (2011.01) |
| *H04N 21/443* | (2011.01) |
| *H04N 21/431* | (2011.01) |
| *H04N 21/422* | (2011.01) |
| *H04N 21/858* | (2011.01) |
| *H04N 21/44* | (2011.01) |
| *H04N 21/462* | (2011.01) |

(52) U.S. Cl.
CPC ....... *H04N 21/47205* (2013.01); *H04N 21/422* (2013.01); *H04N 21/4221* (2013.01); *H04N 21/42212* (2013.01); *H04N 21/4316* (2013.01); *H04N 21/443* (2013.01); *H04N 21/44008* (2013.01); *H04N 21/4438* (2013.01); *H04N 21/462* (2013.01); *H04N 21/858* (2013.01)

(58) Field of Classification Search
None
See application file for complete search history.

(56) References Cited

U.S. PATENT DOCUMENTS

| | | | |
|---|---|---|---|
| 6,295,061 | B1 | 9/2001 | Park et al. |
| 6,412,110 | B1 | 6/2002 | Schein et al. |
| 7,076,734 | B2 | 7/2006 | Wolff et al. |
| 7,549,127 | B2 | 6/2009 | Chasen et al. |
| 8,112,711 | B2 | 2/2012 | Ackley |
| 8,613,020 | B2 | 12/2013 | Knudson et al. |
| 8,732,578 | B2 | 5/2014 | Peebler |
| 8,756,634 | B2 | 6/2014 | Chane et al. |
| 2007/0011702 | A1* | 1/2007 | Vaysman ............... H04N 21/84 725/45 |

(Continued)

OTHER PUBLICATIONS

Bry, Nicolas, "Luminous design for a bright Smart TV experience! An interview with Dale Herigstad", Published on: Apr. 19, 2012 Available at: http://nbry.wordpress.com/2012/04/19/luminous-design-for-a-bright-smart-tv-experience-an-interview-with-dale-herigstad/.

(Continued)

*Primary Examiner* — Justin Shepard
(74) *Attorney, Agent, or Firm* — Aaron Chatterjee; Fehmi Chebil; Micky Minhas

(57) ABSTRACT

A video media viewport/window may be progressively scaled and/or repositioned based on sequential navigational commands received via an input device. A process may include presenting video media within a viewing window that substantially spans an area of the display, and receiving, during playback of the video media, a plurality of sequential user input commands via an input device that indicate a navigational command in a first direction. In response to receiving the sequential user input commands, the system may progressively scale the viewing window to increasingly smaller size viewing windows, position the smaller size viewing windows a distance from a center of the display relative to the direction of the received navigational commands, and present one or more interactive elements outside of the smaller size viewing windows.

20 Claims, 14 Drawing Sheets

(56) References Cited

U.S. PATENT DOCUMENTS

| | | |
|---|---|---|
| 2010/0154000 A1 | 6/2010 | Macrae et al. |
| 2012/0072952 A1 | 3/2012 | Vaysman |
| 2012/0210386 A1 | 8/2012 | Uniyoung et al. |
| 2014/0068669 A1 | 3/2014 | Knudson et al. |
| 2015/0113455 A1* | 4/2015 | Kang et al. .......... G06F 3/04842 715/765 |

OTHER PUBLICATIONS

Moraveji, et al., "DynaLine: A Non-Disruptive TV User Interface for Passive Browsing of Internet Video", In Nineteenth Annual ACM Symposium on User Interface Software and Technology, Oct. 15, 2006, 4 pages.

PCT Search Report and Written Opinion for Applicaton No. PCT/US2015/061722, mailed Feb. 3, 2016, 12 pages.

* cited by examiner

IMMERSIVE SCALING INTERACTIVE TELEVISION

BACKGROUND

Display interfaces for conventional video media (e.g., broadcast television) predominantly rely on "panel-based" overlay technology or picture-in-picture (PiP) technology to allow a viewer of the video media to interact with elements on the display screen. For example, a viewer may press a button on a remote control that causes an overlay panel to be presented on the display screen while the video media continues to play in the background. In this scenario, the overlay panel may present an electronic programming guide (EPG), television settings, or other similar information to the viewer. PiP-based interfaces place the video media in a small viewport that is typically positioned near a periphery of the display, and is overlaid or composited on top of another video feed or on another type of user interface. In either scenario, the user interface is modal, meaning that the viewer can choose to be in either a video media viewing mode (with the video media presented in full screen), or a non-viewing mode (with the video media presented in the background or in a PiP viewport).

SUMMARY

Described herein are techniques and systems for progressively scaling and repositioning a video media viewport/window based on sequential navigational commands received via an input device. The size to which the viewport is scaled and/or the position on the display where the viewport is placed may be in context of directional navigation from an origin point that corresponds to full screen viewing of the video media. In other words, the degree of movement from the origin (full screen viewing) that is indicated by the sequentially received navigational commands may dictate the amount of scaling and the particular position of the scaled viewport on the display screen. For instance, as a viewing user navigates (via an input device) further and further in a direction from the origin (full screen viewing), the viewing window or viewport within which the video media is presented may be progressively scaled to increasingly smaller size viewing windows, and repositioned at respective distances from a center of the display. In addition, upon scaling and repositioning the video media viewport, interactive elements may be presented on the display in areas outside and around the scaled video media viewport. The interactive elements may reflow around the viewport as the viewport is progressively scaled and repositioned.

By providing a display interface that progressively scales and repositions the video media viewport in context of received navigational commands, a continuum of experience may be provided to a user of the display interface that allows her to intuitively navigate in different directions along the continuum and to customize her viewing experience. A hierarchy of contextual content types may be accessible through the interactive elements that are presented on the display interface in a manner that reduces occlusion of rendered content presented by the interactive elements. Therefore, the arrangement of displayed elements is optimized on the screen, while leaving the viewport unobstructed. In addition, the manner in which the scaled video media viewport is positioned on the display screen gives the user a sense of direction so that she may intuitively navigate to a particular viewing experience. Thus, the user can choose how to immerse herself in contextual content at various hierarchically organized levels while keeping the video media "in-frame" (i.e., the video media remains within the frame or area of the display) via a scaled viewing window. Moreover, the display interface respects the user's desired viewing experience by providing a larger video media viewport in instances when it can be inferred that the user is predominantly interested in watching the video media, and providing a smaller video media viewport in instances when it can be inferred that the user is predominantly interested in browsing contextual content.

Furthermore, the techniques and systems described herein provide optimal user interaction performance and system efficiency. User interaction performance may be optimized through the above-described intuitive navigational interfaces that give the user a sense of direction along the continuum of viewing experiences. This intuitive navigational interface works to decrease user selection/navigation error rates, among other things, making the user interaction performance more efficient for the user. For example, by providing a notion of an origin location (full screen viewing) as well as navigational directions that a user can traverse to receive different, predetermined viewing experiences, a user is less likely to navigate to an undesired experience by error, thereby reducing the need for providing additional inputs to the system. In this manner, the display interfaces can be specifically tailored and optimized to provide optimal user interaction performance. Additionally, through the implementation of predetermined hierarchical levels along the continuum of viewing experiences, the systems and techniques disclosed herein may leverage system hardware and software to improve system efficiency. For example, display interface modifications may be embodied in system hardware to allow fast computational performance, in some instances. Additionally, or alternatively, high-efficiency programming languages (e.g., register-based operations, look-up tables, etc.) may be leveraged for certain modifications of the display interfaces where predetermined configurations can be predicted in advance.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Embodiments of the present disclosure are directed to, among other things, techniques and systems for progressively scaling and repositioning a video media viewport/window based on sequential navigational commands received via an input device. For illustrative purposes, video media is often described as broadcast television herein. However, it is to be appreciated that the techniques and systems disclosed herein may utilize video media of any suitable type. A non-exhaustive list of video media contemplated herein includes streaming video, downloaded video, digital versatile disc (DVD) video, Blu-ray video, recorded video (e.g., digital video recorder (DVR) video), and so on. Thus, the techniques and systems described herein are not limited to viewing broadcast television. Additionally, the video media may provide any type of content, such as movies, television programs, games, software programs, etc.

Example Architecture

Figure 1:
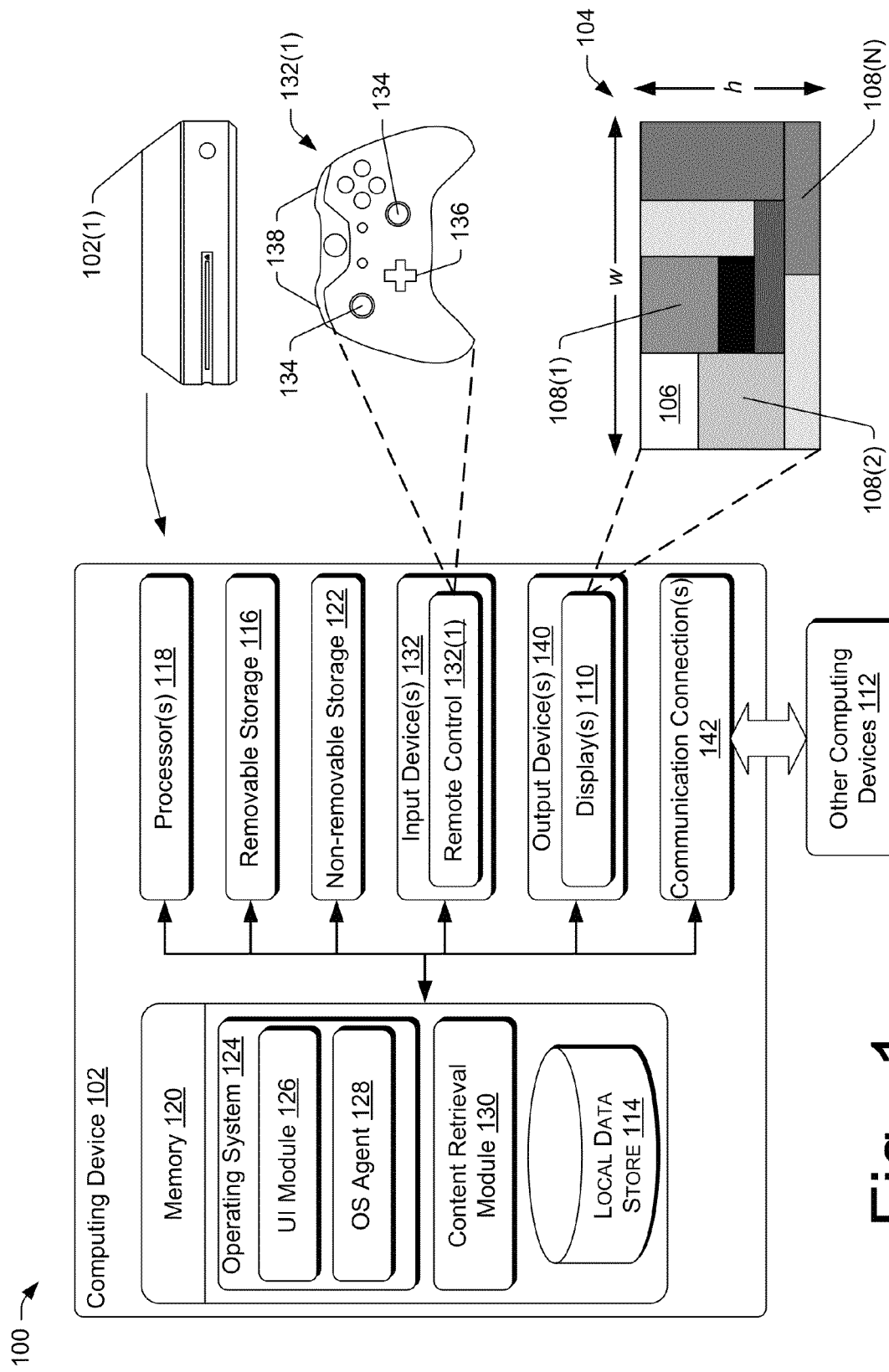
FIG. 1 is a schematic diagram of an example architecture including an example computing device configured to provide an immersive scaling display interface.

FIG. 1 is a schematic diagram of an example architecture 100 including a computing device 102 (sometimes referred to as a "client computing device 102" or "client device 102"). The computing device 102 may be configured to provide a display interface 104 that progressively scales and repositions a viewing window 106 (or "video media viewport 106") in response to sequentially received navigational commands, and is further configured to present one or more interactive elements 108(1), 108(2), . . . , 108(N) (collectively 108) outside of the viewing window 106. The architecture 100 is merely one example, and the techniques described herein are not limited to performance using the architecture 100 of FIG. 1.

The computing device 102 may be implemented as any type of computing device 102 including, but not limited to, a game console, a set-top box (STB), a smart television (TV), a personal computer, a laptop computer, a tablet computer, a portable digital assistant (PDA), a mobile phone (e.g., a smart phone), an electronic book (e-book) reader, a portable game player, a portable media player, and so forth. FIG. 1 shows a representative computing device 102 in the form of a game console 102(1), such as the X-box One® game console, commercially available from Microsoft® Corporation of Redmond, Wash. Another suitable example of computing devices 102 may include the Apple® TV console, commercially available from Apple® Inc. of Cupertino, Calif.

The computing device 102 may be configured to present video media on a display 110 of the computing device 102. The presented video media may be retrieved from any suitable location or video content source. For example, remote sources, which are represented by the other computing devices 112, may provide the video media. The other computing devices 112 may include, without limitation, service providers of broadcast television (e.g., cable operators, satellite operators, etc.), service providers of streaming or downloadable video content (e.g., Netflix®, Youtube®, Hulu®, etc.), and so on. Alternatively, the video media may be retrieved from local sources, such as a local data store 114 (e.g., a hard drive of the computing device 102), or from removable storage 116 (e.g., digital versatile discs (DVDs), Blu-Ray discs, thumb drives, etc.).

The computing device 102 is shown as including one or more processors 118 and one or more forms of computer-readable memory 120. The processor(s) 118 may be configured to execute instructions, applications, or programs stored in the memory 120. In some embodiments, the processor(s) 118 may include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof.

The computing device 102 may also include additional data storage devices, such as the removable storage 116, introduced above, and/or non-removable storage 122 (e.g., one or more hard disk drives (HDDs)). Computer-readable media may include two types of computer-readable media, namely computer storage media and communication media. The memory 120, the removable storage 116, and the non-removable storage 122 are all examples of computer storage media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), DVD, or other optical storage, magnetic cassettes, magnetic tape, magnetic disk storage or other magnetic storage devices, or any other non-transmission medium that may be used to store the desired information and which may be accessed by the computing device 102. Any such computer storage media may be part of the computing device 102. In general, computer storage media may include computer-executable instructions that, when executed by the processor(s) 118, perform various functions and/or operations described herein.

In contrast, communication media embody computer-readable instructions, data structures, program modules, or other data in a modulated data signal, such as a carrier wave, or other transmission mechanism. As defined herein, computer storage media does not include communication media.

The memory 120 may include an operating system (OS) 124, which may include one or more subcomponents, such as a user interface (UI) module 126, and an OS agent 128. The UI module 126 may be configured to output the display interface 104 on the display 110 of the computing device 102. The OS agent 128 may be configured to assist a user of the computing device 102, such as by providing searching functionality, facilitating companion viewing functionality, and other "virtual assistant" functions, as will be described in more detail below.

The memory 120 may further include a content retrieval module 130 that is configured to obtain content from various sources. For example, the content retrieval module 130 may retrieve contextual content or information from the other computing devices 112, the retrieved content being ultimately presented via the display interface 104 as the interactive element(s) 108. As another example, the content retrieval module 120 may retrieve video content from the various aforementioned content sources, such as the other computing devices 112, the local data store 114, the removable storage 116, and/or the non-removable storage 122.

The local data store 114 may store various types of data such as video content (e.g., recorded videos, downloaded or imported videos, and so on), user profile data of the users who operate the computing device 102, and the like. Accordingly, users may be able to log/sign into respective user profiles (e.g., via credentials, biometric data (e.g., fingerprint scan, facial recognition, etc.), and so on) so that the identity of each user may be determined by the computing device 102 to customize a video media viewing experience for the specific user. In this scenario, user profiles that are stored in the local data store 114 may represent individuals and/or groups of users. For example, a shared, family computing device 102 may store a "family" profile for a group of users.

The computing device 102 may include, or may be connectable to, one or more input devices 132 for interfacing with the computing device 102. The input device(s) 132 may include, without limitation, a pointing device (e.g., a mouse, joystick, etc.), physical buttons, a remote control, a camera(s), a microphone(s) (e.g., for receiving voice commands), a touch screen display, and/or any other suitable input device 132. The input device(s) 132 may be a wired or wireless input device(s) 132. FIG. 1 shows a representative example input device 132 in the form of a remote control 132(1) (e.g., a game controller). In some embodiments, the remote control 132(1) may include various buttons and/or manual actuators, including, without limitation, one or more thumbsticks 134, a directional pad 136, bumper buttons 138, and the like, that allow a user to provide various types of user input commands to the computing device 102.

One type of input command that may be input via the input device(s) 132 comprises a navigational command. A navigation command indicates a direction, and the navigational command may be provided via one or more of the thumbsticks 134, the directional pad 136, and/or the bumper buttons 138 to provide directional input (e.g., right, left, up, down, or any intermediate direction thereof) to the computing device 102. In some embodiments, tilting gestures may be enabled by an inertial measurement unit (IMU) of either the input device(s) 132 or the computing device 102 when the computing device 102 is a mobile or hand-held device. For example, gyroscopes, accelerometers, magnetometers, or any combination thereof, may allow for sensing orientation of the input device(s) 132 or the computing device 102 itself that may be analyzed and interpreted as navigational commands. That is, a user may tilt or move the computing device 102 to her right to indicate a rightward navigational command.

In some embodiments, the input device(s) 132 may include a three-dimensional (3D) camera or depth camera that is configured to continuously detect image data (i.e., capture video) of a user with depth information so that movements of the user may be interpreted by onboard processing units of the computing device 102 as user input commands (e.g., navigational commands). For example, a user may extend or swipe her hand to her right to indicate a rightwards navigational command. The camera-based input device(s) 132 may use any suitable technique to capture image data with depth information (e.g., time-of-flight (ToF), structured light imaging, stereo imaging, etc.) to facilitate the techniques described herein. In some embodiments, infrared (IR) sensors may be used to emit and/or detect IR light as a means of ToF imaging. One suitable example camera-based input device 132 that may be used for detecting user input (e.g., navigational commands) is the Kinect® sensor used with the Xbox® console system from Microsoft® Corporation of Redmond, Wash.

The computing device 102 may further include one or more output devices 140 for providing output to a user of the computing device 102. The output device(s) 140 may include, without limitation, the display 110, speakers, tactile feedback mechanisms, a printer, and so on. For example, the display 110 may provide visual output to a user of the computing device 102, such as when outputting the display interface 104 on the display 110. The display 110 may be of any size, as represented by the width, w, and height, h, dimensions of the display interface 104, which may span substantially the entire area (w×h) of the display 110.

The computing device 102 may further include one or more communication connections 142 that allow the computing device 102 to communicate with the other computing devices 112 such as via a network (e.g., the Internet). Additionally, the communications connection(s) 142 may enable WiFi-based communication such as via frequencies defined by the IEEE 802.11 standards, short range wireless frequencies such as Bluetooth®, or any suitable wired or wireless communications protocol that enables the computing device 102 to interface with the other computing devices 112.

Figure 2:
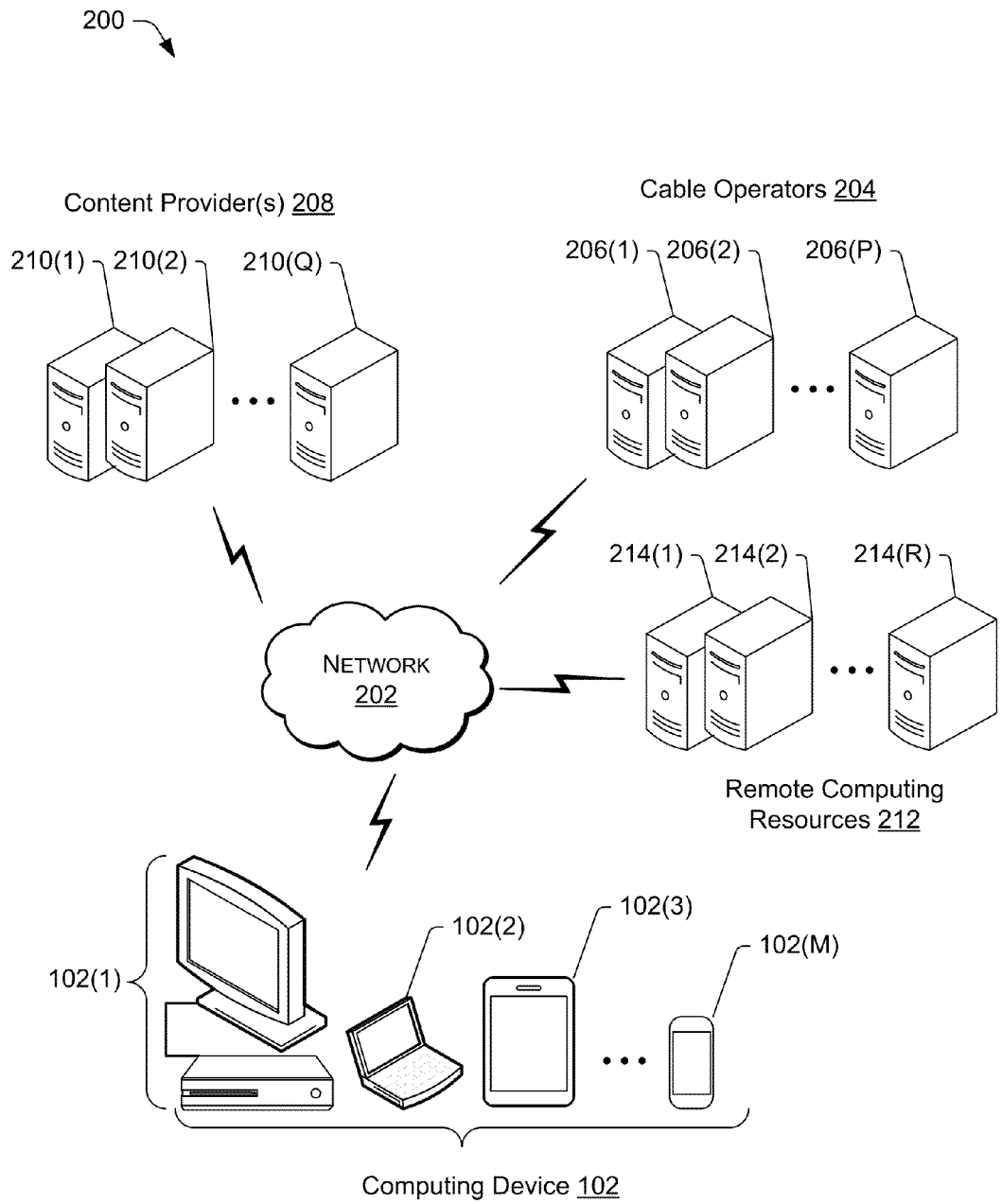
FIG. 2 is a schematic diagram of an example architecture including the example computing device of FIG. 1 and other computing devices configured to transmit or receive data to or from the computing device over a network.

FIG. 2 is a schematic diagram of an example architecture 200 including the example computing device 102 of FIG. 1, which is configured to transmit/receive data to/from other computing devices over a network 202. As noted above, the computing device 102 may include, but is not limited to, any type of computing device 102, such as the game console 102(1) having an associated display, a notebook computer 102(2), a tablet computer 102(3), or a mobile phone 102(M). The network 202 may represent any one or combination of multiple different types of wired and/or wireless networks, such as cable networks, the Internet, local area networks, mobile telephone networks, wide area networks, or a combination of such networks.

The computing device 102 may be configured to receive, via the network 202, video media from one or more cable operators 204 that maintain equipment 206(1), 206(2), . . . , 206(P) (collectively 206) for transmitting video media over the network 202. For example, the cable operator 204 may broadcast television over the network 202 to a plurality of computing devices, such as the computing device 102. Additionally, or alternatively, the equipment 206 may allow for streaming or downloadable video media that is accessible to the computing device 102 on-demand.

The computing device 102 may be configured to retrieve, via the network 202, content from one or more content providers 208 that maintain one or more servers 210(1), 210(2), . . . , 210(Q) (collectively 210) for transmitting content in response to requests from the computing device 102. The content provider(s) 208 may represent various types of content providers, including, without limitation, social networking sites (e.g., Facebook®, Twitter®, etc.), video content sites (e.g., Netflix®, Youtube®, Hulu®, etc.), encyclopedia information sites (e.g., Wikipedia®, IMDB®, etc.), news sites, electronic commerce (e-commerce) sites, media file hosting sites (e.g., OneDrive™, commercially available from Microsoft® Corporation of Redmond, Wash., Google Drive™, commercially available from Google® Inc. of Menlo Park, Calif.), and so on. In some embodiments, the computing device 102 may be configured to utilize one or more search engines (e.g., Bing®, Google Search®, etc.) to search for content available from the content provider(s) 208. For instance, content that is available from the content provider(s) 208 may be indexed by a search engine accessible to the computing device 102 so that the computing device 102 may efficiently retrieve content (e.g., contextual content) from the content provider(s) 208 based on search queries. In some embodiments, the computing device 102 may utilize an application programming interface (API) to programmatically issue such queries to the search engine.

In some embodiments, the computing device 102 may be a thin-client configured to display a graphical user interface (GUI) provided by one or more remote computing resources 212. The one or more remote computing resources 212 may be provided on one or more servers 214(1), 214(2), . . . , 214(R) (collectively 214) for carrying out some or all of the functionality of the techniques and systems described herein. As such, server(s) 214 may include some or all of the components of the computing device 102 described with reference to FIG. 1. In this scenario, the thin-client computing device 102 may include at least a display 110 and a communication connection(s) 142 to receive data over the network 202.

Example Display Interface Functionality

Figure 3:
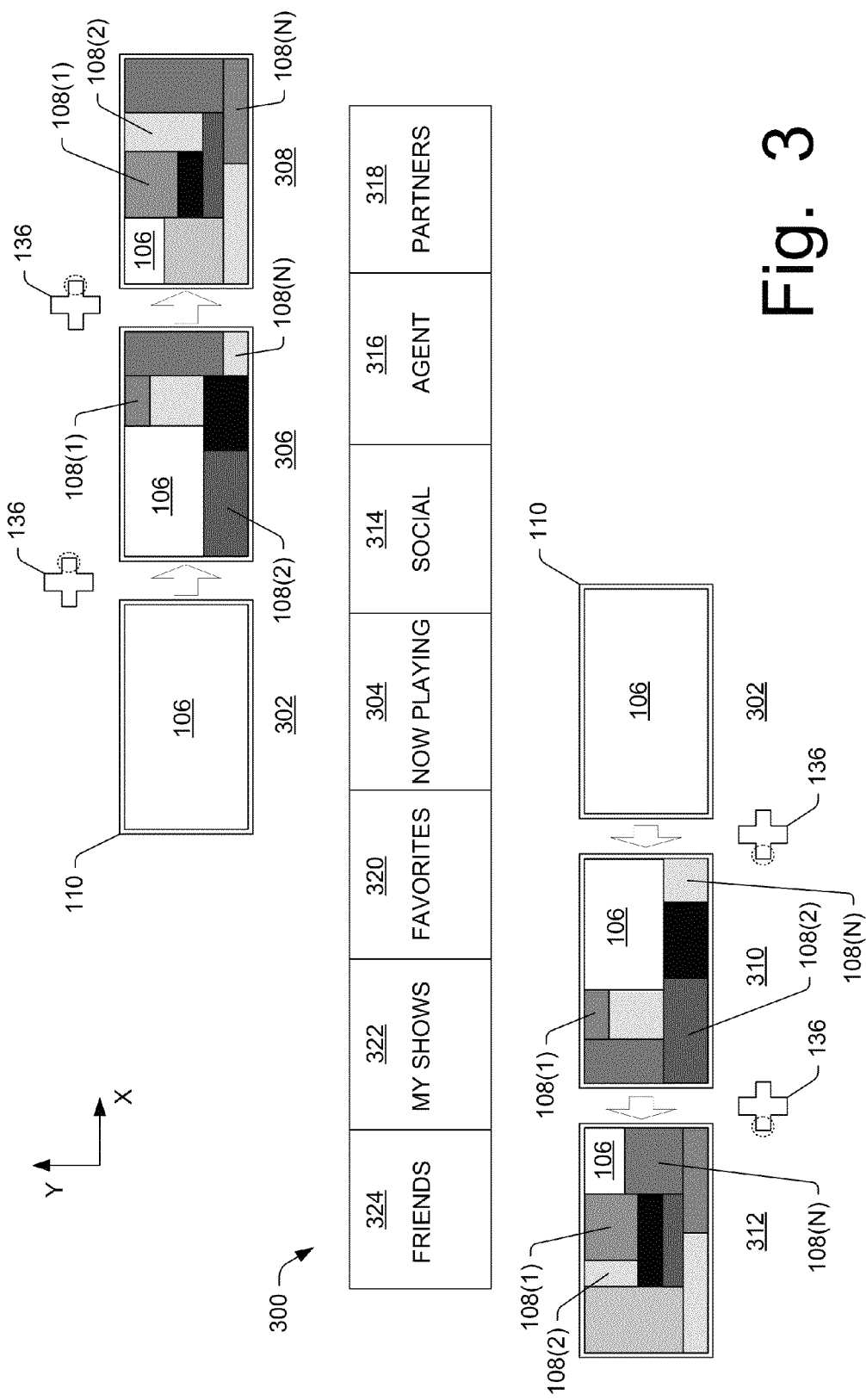
FIG. 3 is a schematic diagram showing various outputs of the immersive scaling display interface that facilitates user navigation through a continuum of video media viewing experiences.

FIG. 3 is a schematic diagram showing various outputs of the immersive scaling display interface 104 that was introduced in FIG. 1. "Display interface," as used herein, may comprise a graphical user interface (GUI). A user of the computing device 102 may interact with the display interface 104 via the input device(s) 132. By interacting with the display interface 104, a user may navigate through a continuum 300 of video media viewing experiences that are made available to the user.

In the example illustrated by FIG. 3, a user may have powered on the computing device 102 and caused the computing device 102 to present video media on the display 110 in the "full screen" viewing state 302. In the full screen viewing state 302, video media (e.g., broadcast television) may be presented within a viewing window 106 that is sized to substantially span the entire area (w×h) of the display 110. For example, live television may be presented within the viewing window 106 in the full screen viewing state 300. The full screen viewing state 300 may correspond to a "lowest engagement" viewing experience referred to as the "now playing" viewing experience 304. The "now playing" viewing experience 304 may define the origin of the continuum 300 of viewing experiences that the user may navigate between.

In some embodiments, the computing device 102 may default to the "now playing" viewing experience 304 upon power-up of the computing device 102. In other embodiments, the user may first invoke an application to view video media on the display 110 where a viewing experience, such as the "now playing" viewing experience 304, may be launched by default. Such an application may be a native application that is integrated into the OS 124, or it may be a standalone, aftermarket application downloaded to the computing device 104, or it may be a web-based application rendered within a browser, or the like.

In response to receipt of sequential user input commands via the input device(s) 132 that each indicate a first navigational direction, different display interfaces, such as the display interfaces 306, 308, 310, and 312, may be output on the display 110. These display interfaces 306-312, progressively scale and reposition the viewing window 106 in context of the received navigational commands. For example, if a user presses the rightmost portion of the directional pad 136 of the remote control 132(1), the display interface 306 may be output on the display 110. Upon a subsequently received user input command in the same navigational direction as the first input command (i.e., rightward or positive X direction), the display interface 308 may be output on the display 110. Thus, as the user continues to navigate further and further to the right, the display interfaces 306 and 308 may be output in order to progressively scale down and reposition the viewing window 106 such that the center of the scaled down viewing window 106 is positioned at a distance from the center of the display 110. The scaling and repositioning of the viewing window 106 may include interpolated data points between two discrete positions to make the scaling and repositioning appear smooth and continuous to the viewer. In some embodiments, the scaling and repositioning between two relative positions may be presented as more discrete steps. In some instances, a component of the direction from the center of the display 110 to the center of the scaled down viewing window 106 is opposite the direction of the navigational command. For example, when a rightward navigational command is received, the center of the scaled viewing window 106 may be positioned in a direction from the center of the display 110 that has at least a component direction in the leftward direction. In other words, the direction from the center of the display 110 to the center of the scaled viewing window 106 may be in a diagonal direction (e.g., upward and leftward direction), and therefore, the diagonal direction may be represented with two components (e.g., an upward component and a leftward component) of the diagonal direction, at least one of them being different than the direction of the navigational command.

In addition, one or more interactive elements 108 may be presented outside of the viewing window 106 in each of the display interfaces 306 and 308. These interactive elements 108 may provide content in context of the navigational commands that corresponds to hierarchically arranged types of content, as shown by the continuum 300.

In the illustrative example shown in FIG. 3, the content to be displayed via the interactive elements 108 may correspond to different viewing experiences along the continuum 300 of viewing experience. In the rightward direction along the continuum 300, viewing experiences may include, without limitation, a "social" viewing experience 314, an "agent" viewing experience 316, and a "partners" viewing experience 318, each of which will be described in more detail below with reference to the following figures. In other words, as the user navigates farther and farther in the rightward (i.e., positive X-direction), she can be immersed in different, hierarchically organized viewing experiences (e.g., viewing experiences 314-318) that are output on the display 110 via the dynamically changing display interfaces 306 and 308, for example.

Similarly, if sequential user input commands are received via the input device(s) 132 indicating a leftward (i.e., a negative X) direction, the display interfaces 310 and 312 may be output on the display 110 in response to the received sequential input. The display interfaces 310 and 312, like the display interfaces 306 and 308, progressively scale and reposition the viewing window 106 in context of the received navigational commands, only this time, the viewing window 106 may be repositioned by moving it in the opposite direction from the center of the display 110. Thus, as the user continues to navigate further and further to the left, the display interfaces 310 and 312 may be sequentially output on the display 110 in order to progressively scale down and reposition the viewing window 106, and to present one or more interactive elements 108 outside of the viewing window 106. These interactive elements 108 may provide content in context of the navigational commands that corresponds to the viewing experiences in the leftward direction along the continuum 300. FIG. 3 illustrates how the interactive elements 108 can be reflowed around the scaled-down viewing window 106, allowing the viewing window to remain visible without occluding the presentation of the interactive elements 108 and the associated content therein.

In the illustrative example shown in FIG. 3, the hierarchically arranged viewing experiences in the leftward direction may include, without limitation, a favorites viewing experience 320, a "my shows" viewing experience 322, and a "friends" viewing experience 324, each of which will be described in more detail below with reference to the following figures. In other words, as the user navigates farther and farther in the leftward (i.e., negative X-direction), she can be immersed in different, hierarchically organized viewing experiences (e.g., the viewing experiences 320-324) that are output via the dynamically changing display interfaces 310 and 312, for example. The hierarchical organization of predetermined viewing experiences can be leveraged by the system to utilized high-efficiency algorithms, and/or combinations of hardware and software that improve computational performance and system efficiency. For example, having predetermined layouts for the display interface 104 along the continuum 300 may allow for modifications of the display interface 104 between points on the continuum 300 to be implements via hardware algorithms or more efficient programming algorithms (e.g., lookup tables).

The example shown in FIG. 3 illustrates how the display interfaces 306-312 give the user a sense of directional navigation when navigating through the continuum 300. This intuited sense of directional navigation through the continuum 300 provides a significant benefit in user interaction performance by clearly indicating to the user how to navigate the continuum 300, thereby reducing or altogether eliminating selection/navigation error rates, which cause unnecessary processing of input commands by the system. In other words, as the user navigates farther and farther in a particular direction, the manner in which the viewing window 106 is positioned relative to the center of the display 110 acts as a visual cue to the user that tells her "if you would like to go back to the full screen viewing state 302, you can move toward the viewing window 106." For example, when the user navigates farther and farther to the right, she knows intuitively to move toward the viewing window 106 (i.e., in the leftward or negative X direction), which can be realized through sequential user input commands using the input device(s) 132.

It is to be appreciated that the display interfaces 306-312 may comprise modeless interfaces (e.g., modeless GUIs) that are implemented as an application configured to simultaneously present the scaled viewing window 106 and the interactive element(s) 108 while allowing user interaction therewith. In this sense, the display interfaces 306-312 are embodied via a single interactive application. For example, the viewing window 106 can be temporarily ignored by the user while the user interacts with the interactive element(s) 108 of the same application, and vice versa. In other words, user input is interpreted the same for all presented user interface elements at all times.

The example viewing experiences in the continuum 300 are merely example viewing experiences. Furthermore, the example left and right directions shown in FIG. 3 are merely example directions that may be utilized with an implementation of the system. For example, navigational commands in the upwards (i.e., positive Y direction), downwards (i.e., negative Y direction), and/or intermediate directions may cause the dynamically changing display interfaces to be output on the display 110 in a similar fashion.

Figure 4:
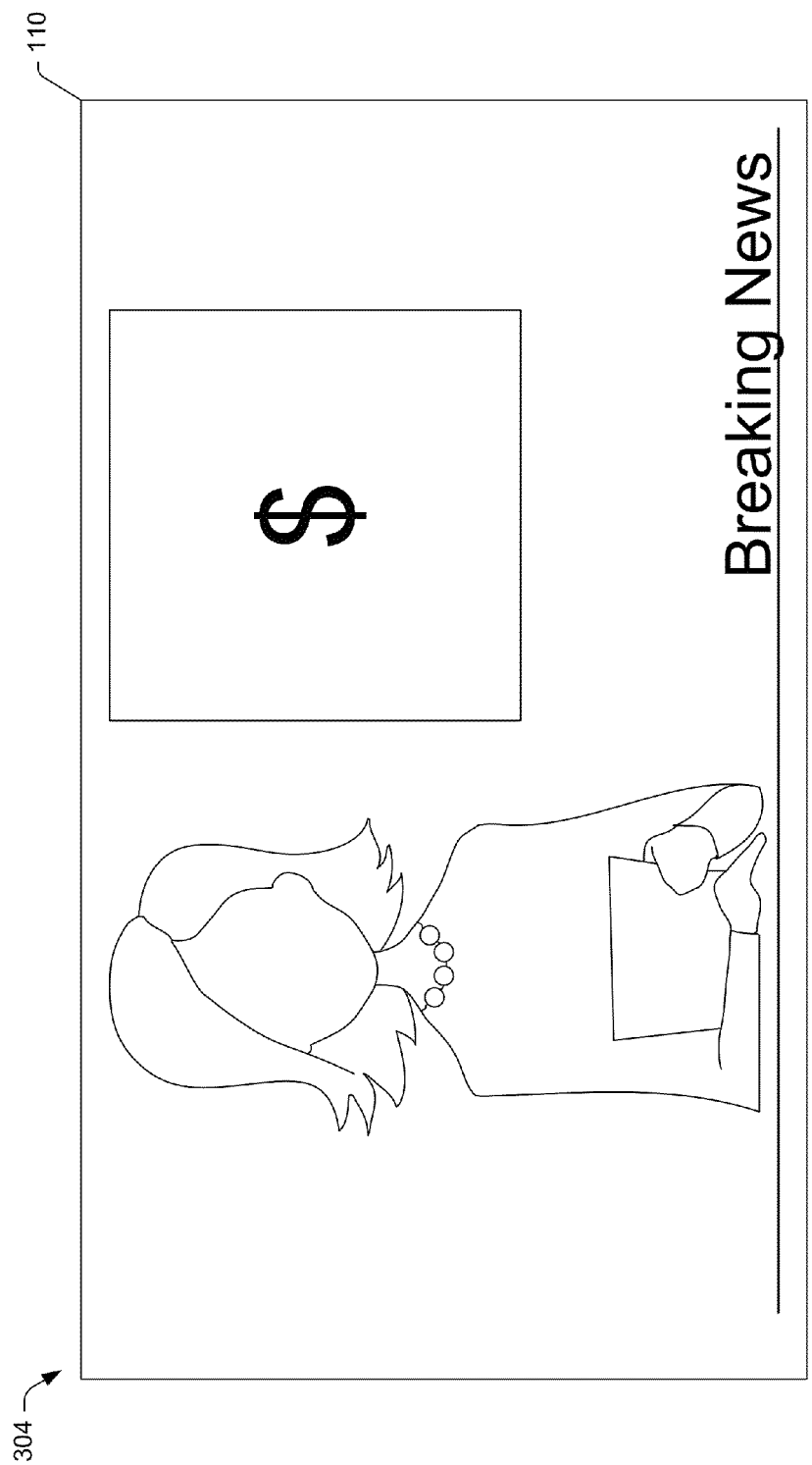
FIG. 4 shows an example display output for a "now playing" viewing experience.
Figure 5:
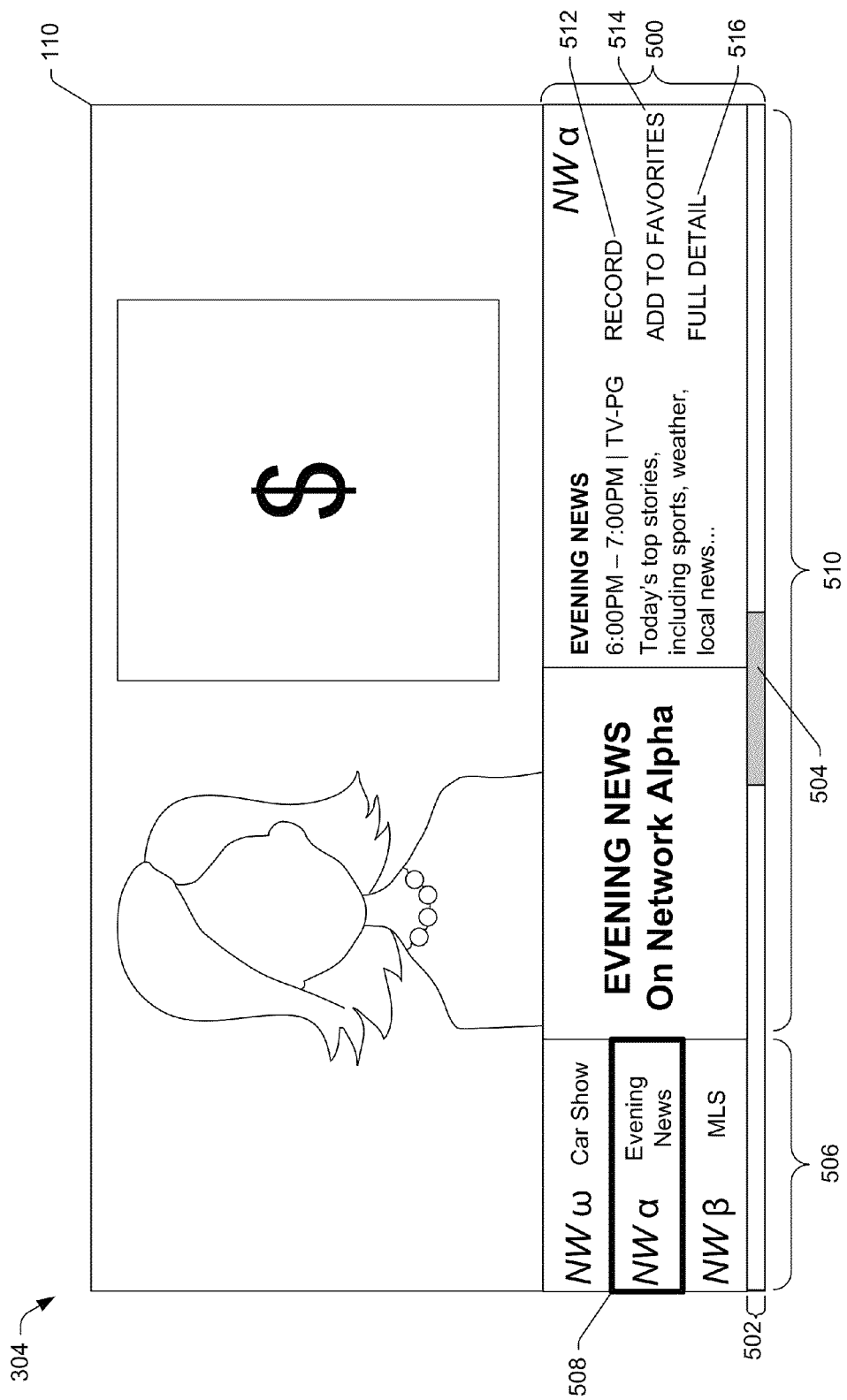
FIG. 5 shows another example display output for the "now playing" viewing experience.
Figure 6:
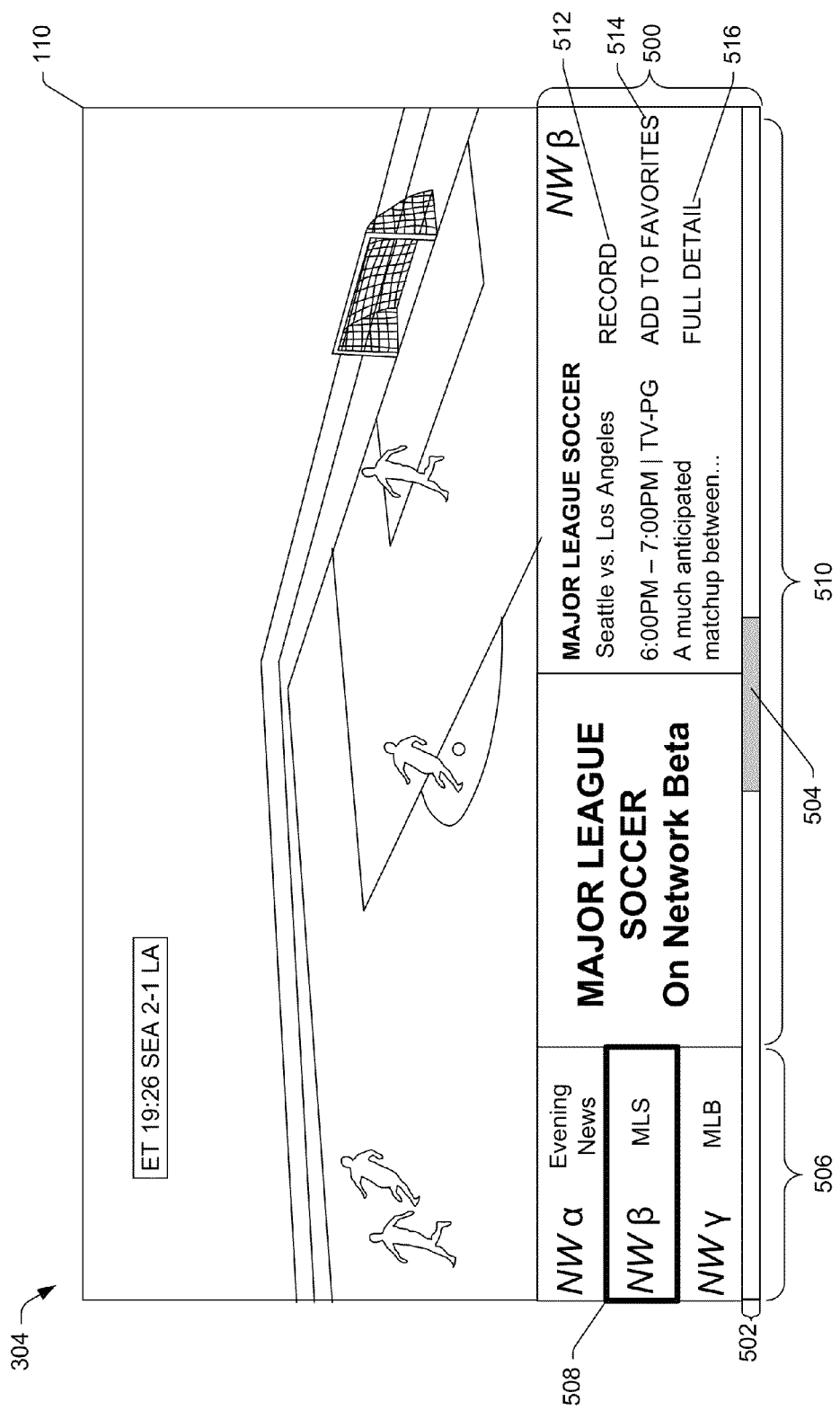
FIG. 6 shows another example display output for the "now playing" viewing experience.

FIGS. 4-6 show example display outputs of the "full screen" viewing state 302 that was introduced in FIG. 3. As noted above, the full screen viewing state 302 shown in FIGS. 4-6 may correspond to the "now playing" viewing experience 304 in a continuum 300 of viewing experiences. Referring to FIG. 4 in particular, the display output in the full screen viewing state 302 comprises video media (e.g., a live television news broadcast). The video media may be presented on the display 110 such that the video media spans substantially the entire area of the display 110; hence the full screen viewing state 302.

If the user provides user input via the input device(s) 132, such as pressing a button (e.g., a portion of the directional pad 136) on the remote control 132(1), the display output shown in FIG. 5 may be rendered on the display 110. Specifically, a panel 500 (sometimes called the "now playing panel 500") may be overlaid on top of the video media presentation. Even though the panel 500 takes up a portion of the display area (e.g., a portion of the bottom of the display screen), the display output of FIG. 5 may still be considered as the full screen viewing state 302 because the video media continues to span substantially the entire area of the display 110 (i.e., the panel 500 merely obscures a small portion of the bottom of the video media). It is to be appreciated that other relatively minor display elements may be overlaid upon, or presented around, the video media in the full screen viewing state 302, such that the video media does not have to span the entire area of the display 110 in the full screen viewing state 302.

In some embodiments, the panel 500 may include a navigation bar 502 that provides a visual indicator 504 of the current viewing experience along the continuum 300. FIG. 5 shows the navigation bar 502 at the bottom of the panel 500, but it may be placed anywhere within the panel 500, and oriented in any suitable manner (e.g., vertically oriented) without changing the basic characteristics of the system. In some embodiments, the visual indicator 504 may comprise a slider element that is movable along the navigation bar 502 in response to navigational commands received from the input device(s) 132.

FIG. 5 shows the visual indicator 504 in the center of the navigation bar 502 to indicate to the user that she is currently within the "now playing" viewing experience 304. It is also to be appreciated that the navigation bar 502 and/or the visual indicator 504 may provide additional and/or different indicators, such as textual descriptions of the different viewing experiences along the continuum 300, colors, and so on. In the "now playing" viewing experience 304, the user may browse channels via a mini-guide 506 that may be provided in a portion of the panel 500. For example, the mini-guide 506 is shown in the leftmost portion of the panel 500, allowing the user to scroll vertically through a channel listing in order to browse and select particular channels in the full screen viewing state 302.

FIG. 5 shows a focus element 508 (or cursor) that indicates a highlighted element that may be selected with the input device(s) 132. In FIG. 5, the focus element 508 is positioned over "Network α," which is currently broadcasting an evening news program. When the user moves the focus element 508 to a particular channel in the mini-guide 506, the panel 500 may update a portion 510 of the panel 500 with a brief synopsis of the program being broadcast on the highlighted channel, as well as one or more interactive display elements, such as a "Record" element 512 that, upon selection, begins recording the program, an "Add to Favorites" element 514 that, upon selection, adds the program to a favorites list, and/or a "Full Detail" element 516 that, upon selection, may direct the user to further information regarding the program (e.g., cast and crew, director biographies, etc.).

If the user moves the focus element 508 to a different channel, such as "Network β" that is currently broadcasting a Major League Soccer program, and the user selects that channel, the video media may present a live broadcast of the program on that channel, as is shown by the display output of FIG. 6. The display output shown in FIG. 6 is still considered as the full screen viewing state 302, which, in this case, may still present the panel 500 for at least a period of time. That is, the panel 500 may disappear after a period of time has lapsed without any received input from the input device(s) 132.

The "now playing" viewing experience 304 that is represented by FIGS. 4-6 may be considered a lowest engagement viewing experience that respects the fact that the user is watching the video media. The "now playing" panel 500 honors the fact that the user is watching the video media by being rendered on the display 110 as a minimally intrusive panel 500 that allows the user to find out what shows are on, when they end, and other functionality to aid the user's "now playing" viewing experience 304.

Figure 7:
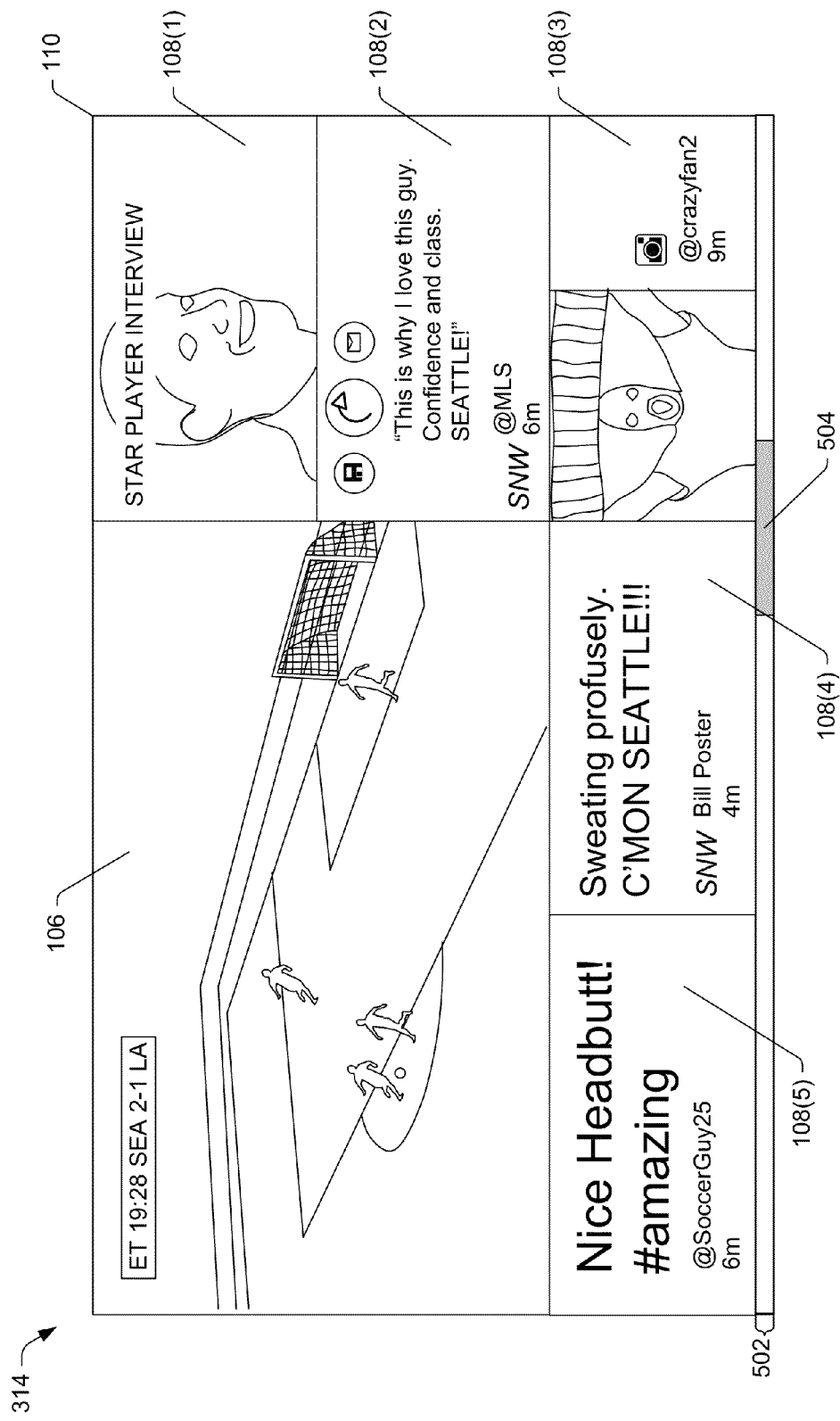
FIG. 7 shows an example display output for a "social" viewing experience where a display interface includes a scaled and repositioned video media viewport.

From the full screen viewing state 302 corresponding to the "now playing" viewing experience 304, the user may navigate in any direction along the continuum 300 to immerse themselves in different viewing experiences. FIG. 7 illustrates an example where the user has provides input via the input device(s) 132 that indicates a rightwards (i.e., positive X) navigational command along the navigation bar 502. The display output of FIG. 7 represents the "social" viewing experience 314 that was introduced with reference to FIG. 3. To provide the "social" viewing experience 314, a display interface such as the display interface 306 of FIG. 3 may be output on the display 110, as shown in FIG. 7. The display interface 306 presents a scaled down video media viewport 106 in the upper left corner of the display 110. In the example of FIG. 7, the viewing window 106 is shown as comprising about ⅔ to about ¾ of the display area. This particular size range of the viewing window 106 respects the fact that the user may still desire to watch the video media while concurrently browsing the interactive elements 108(1)-(5) that are presented outside of the viewing window 106. In fact, the notion that the display output of FIG. 7 represents a "viewing experience" exemplifies the fact that the user may prefer to watch the video media in the "social" viewing experience 314 on a more permanent basis. In contrast to typical PiP viewports which are too small to continually watch video media in, the size of the viewing window 106 allows for more permanent viewing of video media while interacting with the content of the interactive elements 108. The continuum 300 allows the user to choose what viewing experience to immerse herself in. In some embodiments, the computing device 102 may be configured to remember a particular viewing experience as a "favorite" viewing experience of a particular user so that the display output can default to the user's favorite viewing experience upon powering on the computing device 102. In some embodiments, the computing device 102 may remember a "most recent" viewing experience that the user was in before the user exited to the full screen, "now playing" viewing experience 304. For example, the user may have viewed the "partners" viewing experience 318, then selected a "back" button ("B" button) on the input device 132 to return to full screen, and then provided a directional input (e.g., selection of the directional pad 136). In response to the directional input, the display interface 104 may return to the most recent viewing experience; in this case, the "partners" viewing experience 318, instead of traversing through the intermediate viewing experiences between the "now playing" viewing experience 304 and the "partners" viewing experience 318.

FIG. 7 also illustrates that the visual indicator 504 may be presented in a position on the navigation bar 502 that indicates to the user that they are currently in the "social" viewing experience 314. The movement of the visual indicator 504 along the navigation bar 502 may be in the same direction as the received navigational command from the user (in this case, the rightward or positive X direction) to provide the user with a sense of direction as she navigates along the continuum 300.

FIG. 7 also illustrates that the position of the viewing window 106 is in a portion of the display 110 that is in a different direction from the center of the display 110 than the direction of the received navigational command. For example, the position of the viewing window 106 does not move to the right in response to a rightward navigational command from the user. Rather, the center of the viewing window 106 may be positioned left of the center of the display 110 in response to a received rightward navigational command. Additionally, or alternatively, the center of the viewing window 106 may be positioned above or below the center of the display 110. FIG. 7 illustrates the example where the center of the viewing window 106 is positioned both left and above the center of the display 110 in order to place the viewing window 106 in the top left corner of the display 110. Placement of the viewing window 106 in a corner of the display 110 may allow the user's eyes to more easily track or locate the viewing window 106 as opposed to placing the viewing window 106 elsewhere and surrounding the viewing window 106 on 3 or 4 sides by the interactive elements 108.

The "social" viewing experience 314 may include interactive elements 108(1)-(5) that provide "social" content so that the user can discover activity in a community of users that is related to the program being played back within the viewing window 106. The content retrieval module 130 may retrieve such content over the network 202 from the content provider(s) 208. For example, the content retrieval module 130 may retrieve contextual content from social networking sites, such as Twitter®, Facebook®, Instagram®, and so on. The content retrieval module 130 may search social networking sites for relevant content based on keywords, image analysis, or any other suitable search technology. In some embodiments, a search engine may be utilized to search the content available from social networking sites. Because of the limited "real-estate" on the display 110 outside of the area allocated for the video media viewport 106, the content retrieval module 130 may filter or otherwise curate the retrieved content to a "best" content subset that is to be presented via the interactive elements 108(1)-(5). The selection of the "best" content may be based on a number of factors, such as quality of media files (e.g., images or videos) of the retrieved content, diversity indicators that analyze posts (e.g., text, images, videos, etc.) that are not too similar, age of the posts (e.g., newer posts may be selected over older ones), and/or user interaction characteristics (e.g., the number of "likes", re-shares, comments, top trending posts, etc.). Furthermore, a current state of relationship between the user of the computing device 102 and other users in the social community may factor into the filtering/curating of content (e.g., close friends and family activity may be selected over more distant social connections, when applicable).

Because the user is watching a soccer game in the viewing window 106, the content retrieval module 130 may search for posts, status updates, and media files (e.g., images, videos, etc.) that are related to soccer in general, and/or to the specific soccer game being broadcast in the viewing window 106. For example, the interactive elements 108(1) and 108(2) may present a social media post from a user of a social networking (SNW) service regarding an interview of one of the star players in the game that is being broadcast. The interactive element 108(2) may present buttons that allow the user to save the posted video to the local data store 114 of the computing device 102, to re-share the posted video via the social networking service or via another social networking service, and/or to send the video, or a link to the video, via electronic mail (e-mail), short message service (SMS) text, and the like. The interactive element 108(3) may present a picture that a user posted to a social networking site (e.g., a user who is at the soccer game being shown in the viewing window 106). The interactive elements 108(4) and 108(5) may present status updates or posts (e.g., microblogs) from users of various social networking sites that are related to the currently playing video media in the viewing window 106. The content presented via the interactive elements 108(1)-(5) may be contextual by relating to the currently broadcast program and may provide a more social viewing experience for the user.

Figure 8:
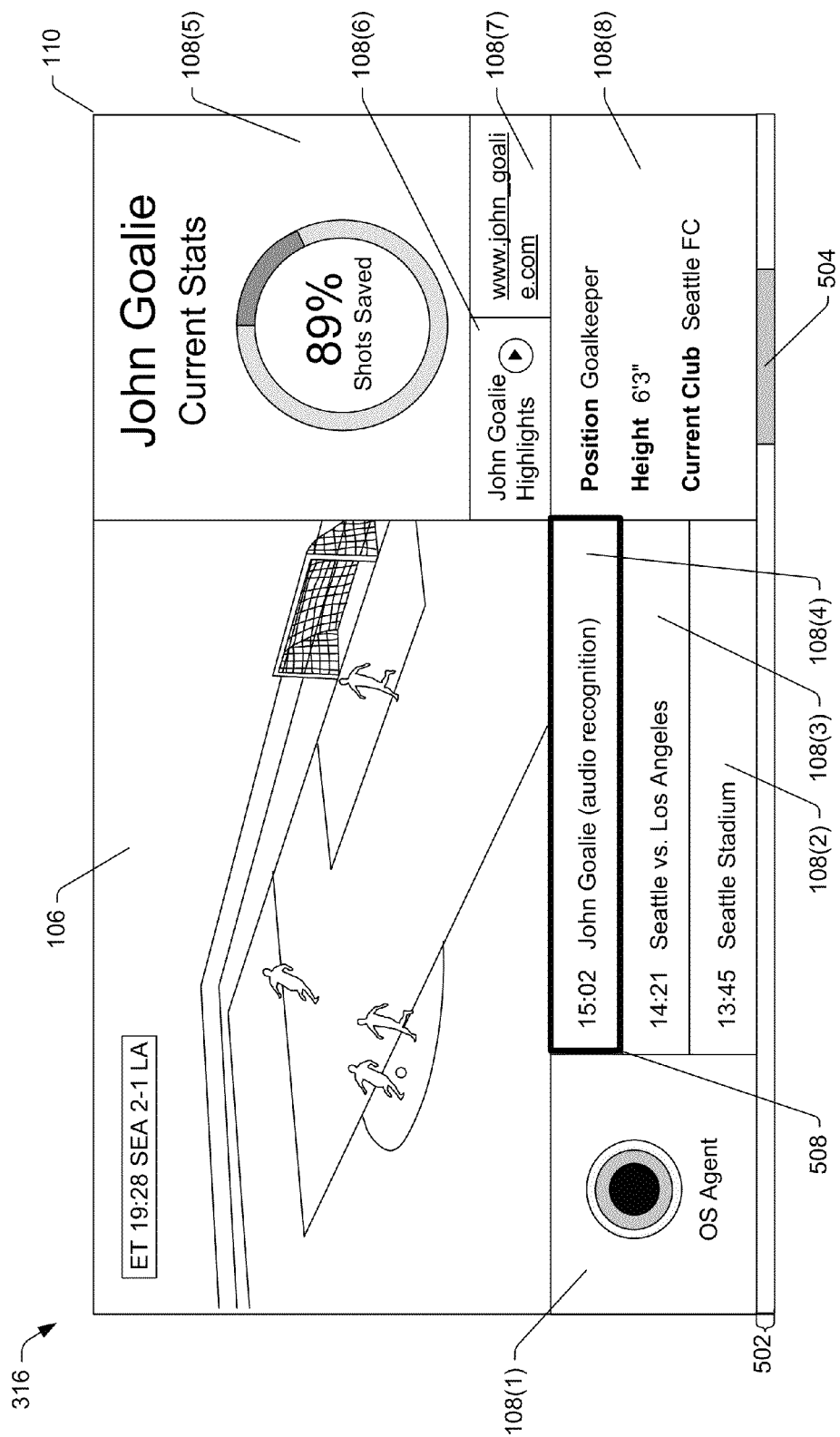
FIG. 8 shows an example display output for an "agent" viewing experience.

From the "social" viewing experience 314, the user may provide another rightward navigational command (e.g., by pressing the rightmost portion of the directional pad 136 on the remote control 132(1)) to navigate to the "agent" viewing experience 316 illustrated by FIG. 8. It is noted that the size and/or position of the video media viewport 106 between the "social" viewing experience 314 and the "agent" viewing experience 316 may not change. In other words, individual ones of sequentially received navigational commands may not cause any scaling or repositioning of the video media viewport 106, but may cause the type of content of the interactive elements 108 outside of the viewing window 106 to change. The transition from FIG. 7 to FIG. 8 illustrates this scenario. In this case, the additional rightward navigational command caused the interactive elements 108 to be updated with different content that is related to the "agent" viewing experience 316. The visual indicator 504 may also move farther to the right in response to the received navigational command in the rightward direction to indicate to the user that she is in the "agent" viewing experience 316.

The "agent" viewing experience 316 may cause the display interface to present an interactive element 108(1) that indicates to the user that the OS agent 128 is currently "viewing" the video media together with the user. One suitable example of an OS agent 128 for use with the "agent" viewing experience 316 is Cortana™, commercially available from Microsoft® Corporation of Redmond, Wash. The OS agent 128 may "view" the video media with the user by analyze metadata (e.g., closed captioning) associated with the video media, performing visual and/or audio analysis (e.g., voice recognition, song recognition, etc.) of the video stream, and the like. As the OS agent 128 performs real-time analysis of the video media that is playing in the viewing window 106, the OS agent 128 may create a series of time entries, shown as interactive elements 108(2), 108(3), and 108(4). For example, at time 13:45, the OS agent 128 may have analyzed metadata of the video media or the video stream itself to determine that the soccer match is being played at the soccer stadium in Seattle, Wash., and created time entry 108(2). At a later time (14:21), the OS agent 128 recognized that the teams in the soccer match are Seattle vs. Los Angeles, and created time entry 108(3). At an even later time (15:02), the OS agent 128 may have recognized (via audio recognition) that the announcer said the goalie's name "John Goalie," and created time entry 108(4). As new time entries are added, the previous time entries may be pushed down until they disappear from the display screen. The user may still scroll back through previous time entries to recall content related to those time entries.

As each time entry is presented, and/or in response to the focus element 508 being moved over a particular time entry (e.g., time entry 108(4)), interactive elements 108(5)-(8) may be updated with content that is relevant to that time entry 108(4). For example, the content retrieval module 130 may access a sports site that tracks statistics of the soccer match for each player and for the teams to present, for example, percentage of shots that were saved by "John Goalie," shown by interactive element 108(5). The content retrieval module 130 may also retrieve videos that are relevant to the time entry 108(4), such as a highlight video 108(6). Links to informational, encyclopedia, and/or news sites may be presented, such as the link shown in interactive element 108(7). Player statistics may be retrieved from any suitable content source and presented via interactive element 108(8).

Figure 9:
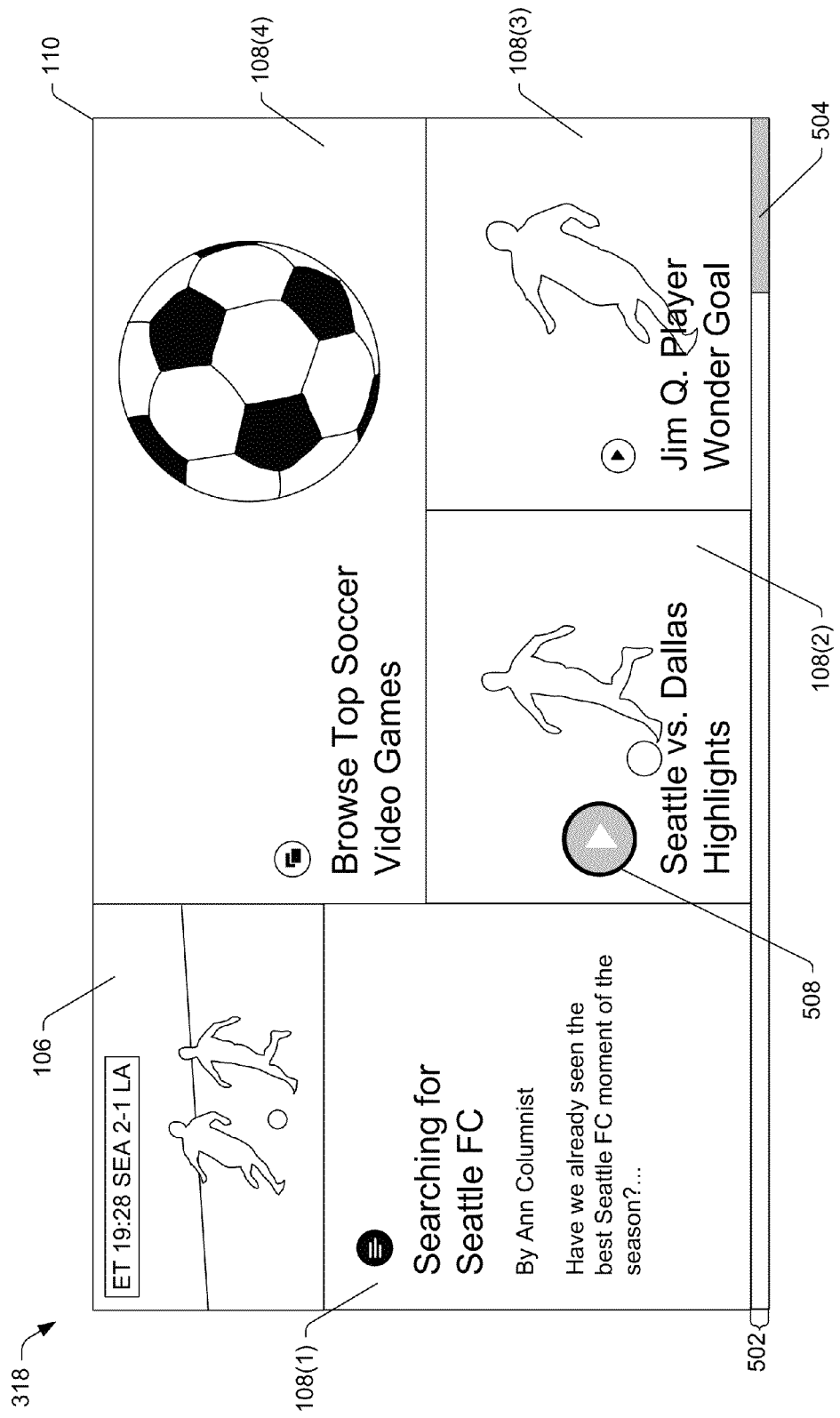
FIG. 9 shows an example display output for a "partners" viewing experience where a display interface includes a scaled and repositioned video media viewport.

From the "agent" viewing experience 316, the user may provide another rightward navigational command (e.g., by pressing the rightmost portion of the directional pad 136 on the remote control 132(1)) to navigate to the "partners" viewing experience 318 illustrated by FIG. 9. The visual indicator 504 may be presented in a rightmost position in response to the received navigational command in the rightward direction to indicate to the user that she is in the "partners" viewing experience 318. Furthermore, the viewing window 106 may be further scaled down in size to a smaller size viewing window 106 (e.g., about ¼ of the display area or less) and repositioned further to the left and further above the center of the display 110. The size of the scaled viewing window 106 may be based on the notion that it can be inferred that the user is no longer predominantly interested in watching the video media program, but is perhaps more interested in immersing themselves deeper into the contextual content provided via the interactive elements 108. The associated display interface (e.g., the display interface 308) may be a "highest engagement" form of the display interface to engage the user with contextual content via the interactive elements 108 as much as possible. Thus, the viewing window 106 may be scaled to various sizes (the viewing window 106 is not limited to scaling to only one size) depending on the particular viewing experience that the user navigates to along the continuum 300.

In FIG. 9, the viewing window 106 is still positioned in the corner of the display 110, but it is not limited to a corner position. The direction of movement of the viewing window 106 is generally different from the direction of the received navigational commend, which, in this case, is in the rightward (i.e., positive X) direction. Accordingly, the "partners" viewing experience 318 may be enabled by outputting the display interface 308 of FIG. 3.

The content presented via the interactive elements 108(1)- (4) in the "partners" viewing experience 318 may comprise news articles, blogs, exclusive content from the studio that provides the video media program, or any similar type of content that is related to the video media program playing in the viewing window 106. Again, because of the limited "real-estate" of the display 110, a curated set of the "best" content related to the video media program may be presented on the display screen, yet the user may be able to scroll (vertically and/or horizontally) or otherwise page through additional "off-screen" interactive elements 108 that provide additional content for the "partners" viewing experience 318. FIG. 9 shows the interactive element 108(1) as providing an article from a website that is related to the soccer program being played in the viewing window 106. The content retrieval module 130 may have leveraged a search engine to retrieve the article presented via interactive element 108(1). Interactive element 108(2) may present a highlights video for one of the teams playing in the soccer program, while interactive element 108(3) may present another highlight clip of a player for one of the two soccer teams, named "Jim Q. Player." Interactive element 108(4) may, upon selection, allow the user to browse soccer-related video games. In some embodiments, the user may be able to launch a video game that is related to the video media program being played in the viewing window 106 so that the user can play the related game in parallel to watching the program. For example, the user may be watching Jeopardy® and may decide that they want to play the video game while watching the program.

In some embodiments, if the user were to move the focus element 508 over the interactive element 108(2), as shown in FIG. 9, to begin playing the highlights video, the computing device 102 may temporarily pause the playback of the video media in the viewing window 106 while the highlights video is played back in another window outside of the viewing window 106. To provide this functionality, the computing device 106 may include a DVR or other recording component to at least buffer the video media as it is played back so that it may be paused, and/or so that the user may seek backward/forward in the video media stream. In some embodiments, the highlights video, upon selection, may relocate to the larger interactive element 108(4) while it is played back. In some embodiments, the highlights video may take over a full screen viewing state 302, at least temporarily while the highlights video is played back, and upon termination, the display output may revert to the display interface 308, as depicted in FIG. 9.

The hierarchical organization of the viewing experiences in the continuum 300 of FIG. 3 may be organized such that the viewing experiences 314-318 in the rightward (positive X) direction allow a user to immerse herself further and further into contextual content that is related to the video media program being played back in the viewing window 106, while the viewing experiences 320-324 in the leftward (negative X) direction allow the user to immerse herself further and further into content that is not related to the show, but is in context of the received navigational commands. Thus, FIGS. 7-9 illustrate viewing experiences in the rightward (positive X) direction that provide contextual content that is related to the video media program in the viewing window 106, and the following figures will illustrate the types of content that may be provided in the viewing experiences that are in the leftward (negative X) direction. It is to be appreciated that the directions and content types can be hierarchically organized in other ways, and that the leftward/rightward organization illustrated herein are merely one example implementation.

Figure 10:
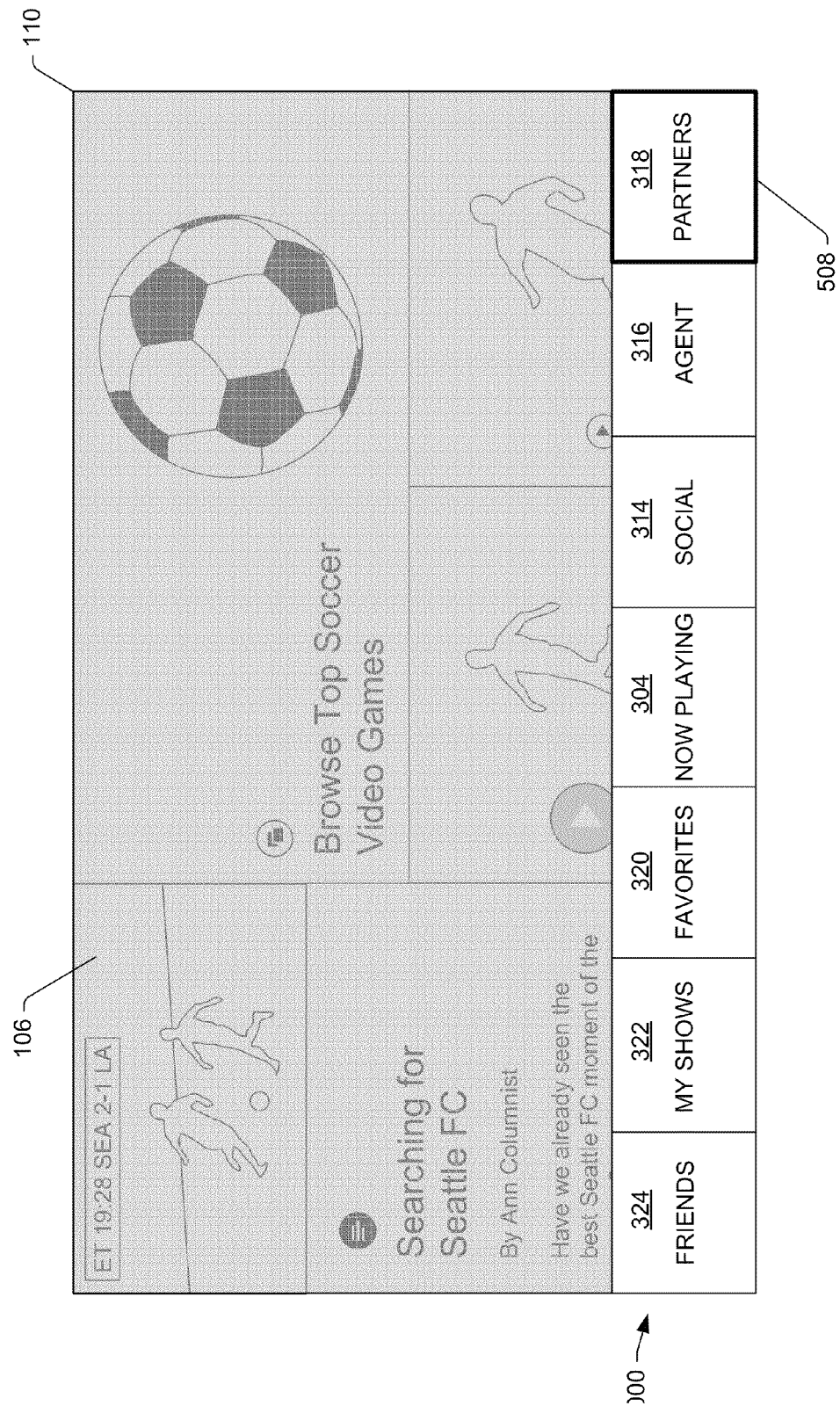
FIG. 10 shows an example display output with a navigation interface to allow a user to skip to a particular viewing experience along a continuum of viewing experiences.

Referring now to FIG. 10, an example display output with a navigation interface 1000 is shown. The navigation interface 1000 may be invoked in response to receipt of user input via the input device 132, such as in response to the user pressing the bumper buttons 138 on the remote control 132(1). The navigation interface 1000 may replicate the continuum 300 of viewing experiences introduced with reference to FIG. 3, and may allow a user to skip to a particular viewing experience along the continuum 300. For example, the user may provide user input via the input device(s) 132 in order to move the focus element 508 to any particular viewing experience in order to navigate directly to that viewing experience. This may be desirable if the user wants to navigate from the "partners" viewing experience 318 to the "friends" viewing experience 324, for example, rather than traversing back through each intermediate viewing experience in the continuum 300. Additionally, or alternatively, the user may press a back button on the remote control 132(1) to return to the "now playing" viewing experience 304 in the full screen viewing state 302. The above-described features work to improve the efficiency of user interaction performance. For example, the system can change from one viewing experience to another, non-adjacent viewing experience without having to process and render the display interfaces associated with intermediate viewing experiences on the continuum 300. This greatly improves user interaction efficiency as the user navigates the continuum.

Figure 11:
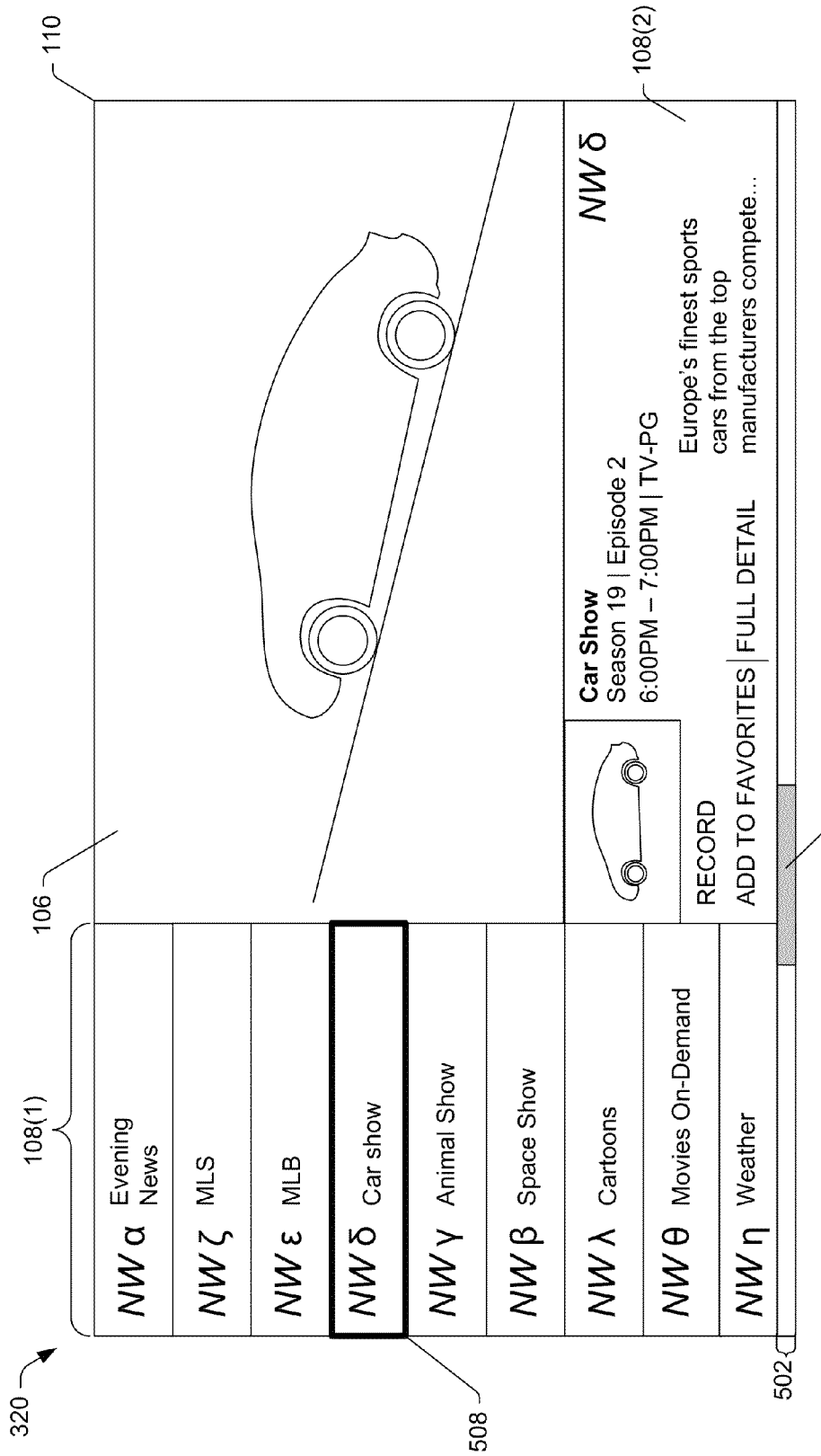
FIG. 11 shows an example display output for a "favorites" viewing experience where a display interface includes a scaled and repositioned video media viewport.

Imagine, for example, that the user navigates to the "favorites" viewing experience 320 by, for example, moving the focus element 508 over the "favorites" viewing experience 320 within the navigation interface 1000 of FIG. 10. The resulting display output may be that which is shown in FIG. 11. In the "favorites" viewing experience 320, the visual indicator 504 may be positioned on a portion of the navigation bar 502 that indicates to the user that she is in the "favorites" viewing experience 320, which, in this case, is slightly left of center on the navigation bar 502. The viewing window 106 may also be scaled and positioned in a direction from the center of the display 110 that is opposite the direction of navigation from the origin (i.e., "now playing" viewing experience 304) to the "favorites" viewing experience 320. For example, because the "favorites" viewing experience 320 is oriented to the left of the continuum origin, the center of the viewing window 106 may be positioned right of the center of the display 110 and/or above or below the center of the display 110. In the example of FIG. 11, the viewing window 106 is positioned in the top right corner of the display 110 and is scaled to a size that is about ⅔ to about ¾ of the display area to honor the fact that the user may be predominantly interested in viewing the video media program while browsing the additional content within the "favorites" viewing experience 320.

The "favorites" viewing experience 320 may provide, via interactive elements 108(1) and 108(2) presented outside of the viewing window 106, recently viewed channels and/or favorite channels of the user. The interactive element 108(1) may comprise a guide that is scrollable and/or pageable by providing input via the input device(s) 132. FIG. 11 shows that the user has moved the focus element 508 over "Network 6" and has provided user input via the input device(s) 132 to select the program "Car show" on that network/channel for viewing in the video media viewport 106. Interactive element 108(2) may provide a brief synopsis of the program being broadcast on the highlighted channel, as well as one or more interactive display elements, such as a "Record" element, an "Add to Favorites" element, and/or a "Full Detail" element similar to those described with reference to the display output of FIG. 5. Within the "favorites" viewing experience 320, the user may continue to watch the video media program in the viewing window 106 while browsing through their recently watched and/or favorite channels.

Figure 12:
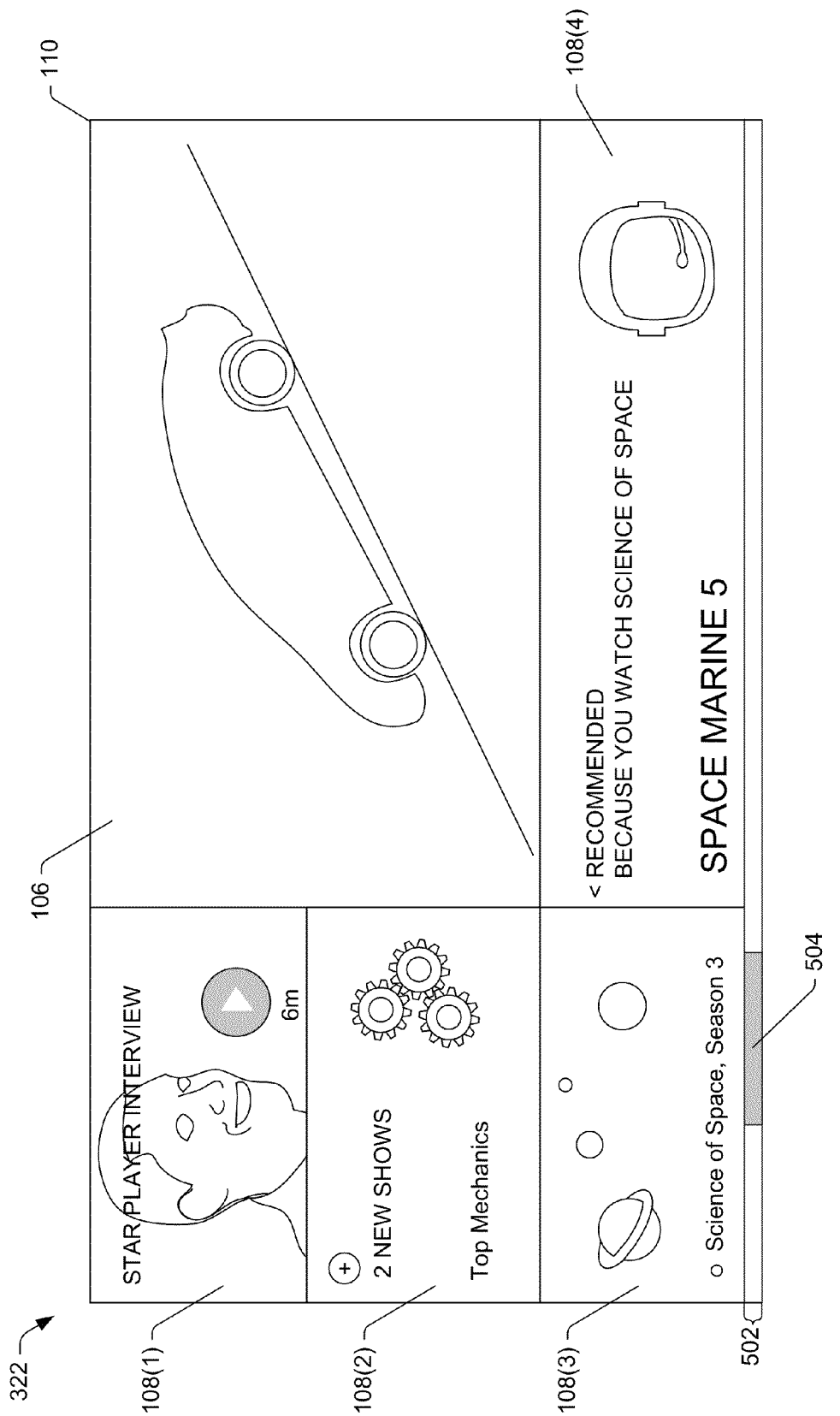
FIG. 12 shows an example display output for a "my shows" viewing experience.

From the "favorites" viewing experience 320, the user may provide a leftward navigational command (e.g., by pressing the leftmost portion of the directional pad 136 on the remote control 132(1)) to navigate to the "my shows" viewing experience 322 illustrated by FIG. 12. The visual indicator 504 may be moved to the left along the navigation bar 502 in response to the received navigational command in the leftward direction to indicate to the user that she is in the "my shows" viewing experience 322. Again, it is noted that the size and/or position of the video media viewport 106 between the "favorites" viewing experience 320 and the "my shows" viewing experience 322 may not change in the transition from FIG. 11 to FIG. 12, yet the type of content of the interactive elements 108 outside of the viewing window 106 may update in context of the navigational command. In this case, the additional leftward navigational command from the "favorites" viewing experience 320 caused the interactive elements 108 to be updated with different content that is related to the "my shows" viewing experience 322.

The content presented via the interactive elements 108(1)-(4) of FIG. 12 may include programs that the user has recorded using the DVR functionality of the computing device 102, programs are being recorded or marked/scheduled for recording, programs that the user has marked as favorites, programs that the user has recently watched, and/or system recommendations for programs that are likely to be of interest to the user based on the user's viewing history. FIG. 12 shows interactive element 108(1) as a video that the user has recently recorded or saved to the local memory of the computing device 102. Interactive element 108(2) may present a program that the user has marked as a favorite, and may further indicate a number of shows that are new (at least in terms of whether the user has watched the programs or not). Interactive element 108(3) may present a program that the user has recently watched, which may be more of a system-inferred favorite program. The column of interactive elements 108(1)-(3) in FIG. 12 may be scrollable and/or pageable so that the user can browse additional content in the "my shows" viewing experience 322. Interactive element 108(4) may present a system recommendation of a program that the user may be interested in based on the user's viewing history.

Figure 13:
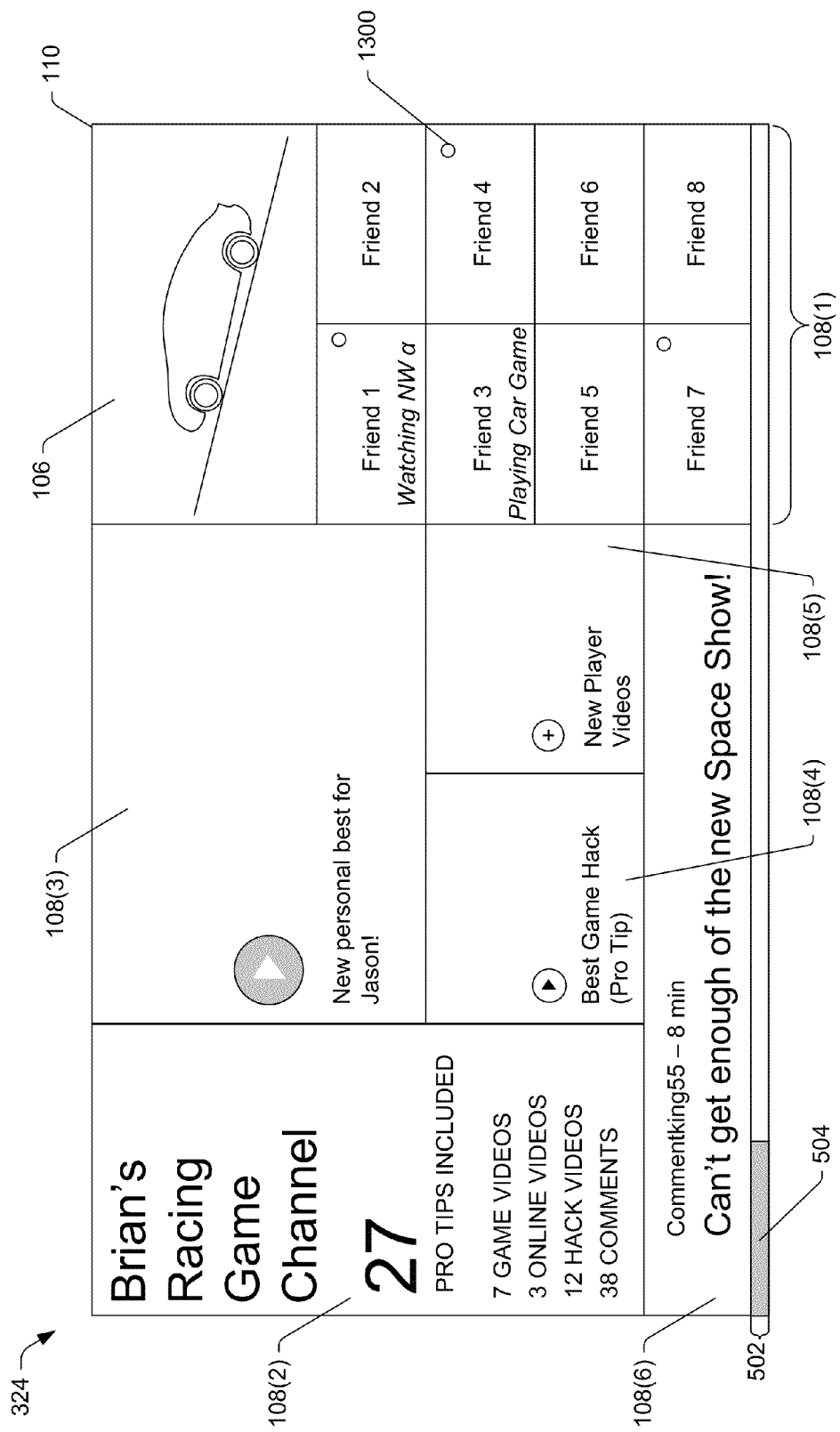
FIG. 13 shows an example display output for a "friends" viewing experience where a display interface includes a scaled and repositioned video media viewport.

From the "my shows" viewing experience 322, the user may provide another leftward navigational command (e.g., by pressing the leftmost portion of the directional pad 136 on the remote control 132(1)) to navigate to the "friends" viewing experience 324 illustrated by FIG. 13. The visual indicator 504 may be positioned at a leftmost portion of the navigation bar 502 in response to the received navigational command in the leftward direction to indicate to the user that she is in the "friends" viewing experience 324. In addition, the viewing window 106 may be scaled and repositioned in a direction from the center of the display 110 that is different from the direction of the received navigational command. In this case, in response to the leftward (i.e., negative X direction) navigational command, the position of the viewing window 106 is moved to the right of the center of the display 110 and/or above or below the center of the display 110. In FIG. 13, the viewing window 106 is shown as being placed in the upper right corner of the display 110. The smaller size of the scaled viewing window 106 appreciates the fact that the user may be less interested in watching the video media program, and relatively more interested in browsing the additional content provided via the interactive elements 108 outside of the viewing window 106. The associated display interface (e.g., the display interface 312) may be a "highest engagement" form of the display interface to engage the user with additional content via the interactive elements 108 as much as possible.

FIG. 13 shows an interactive element section 108(1) that presents a curated set of the user's social connections (e.g., friends), as well as status indicators 1300 that may indicate whether a particular social connection is online. The interactive element section 108(1) may further include brief descriptions of what individual social connections are doing, which may be based on status updates, check-ins, and the like, that the users have consented to provide through a social networking service. Other interactive elements 108(2)-(5) in the "friends" viewing experience 324 may present activity feeds from particular social connections, videos from social connections, and/or other types of posts (e.g., comments) about trending topics, and the like. The "friends" viewing experience 324 is therefore catered toward allowing the user to see what her friends are doing (e.g., channels they are watching, games they are playing, posts they are making that are unrelated to the video media playing in the viewing window 106, etc.), and to browse content generated by her social network, join games and community activities that the user's friends may be involved with, and so on.

Example Process

Figure 14:
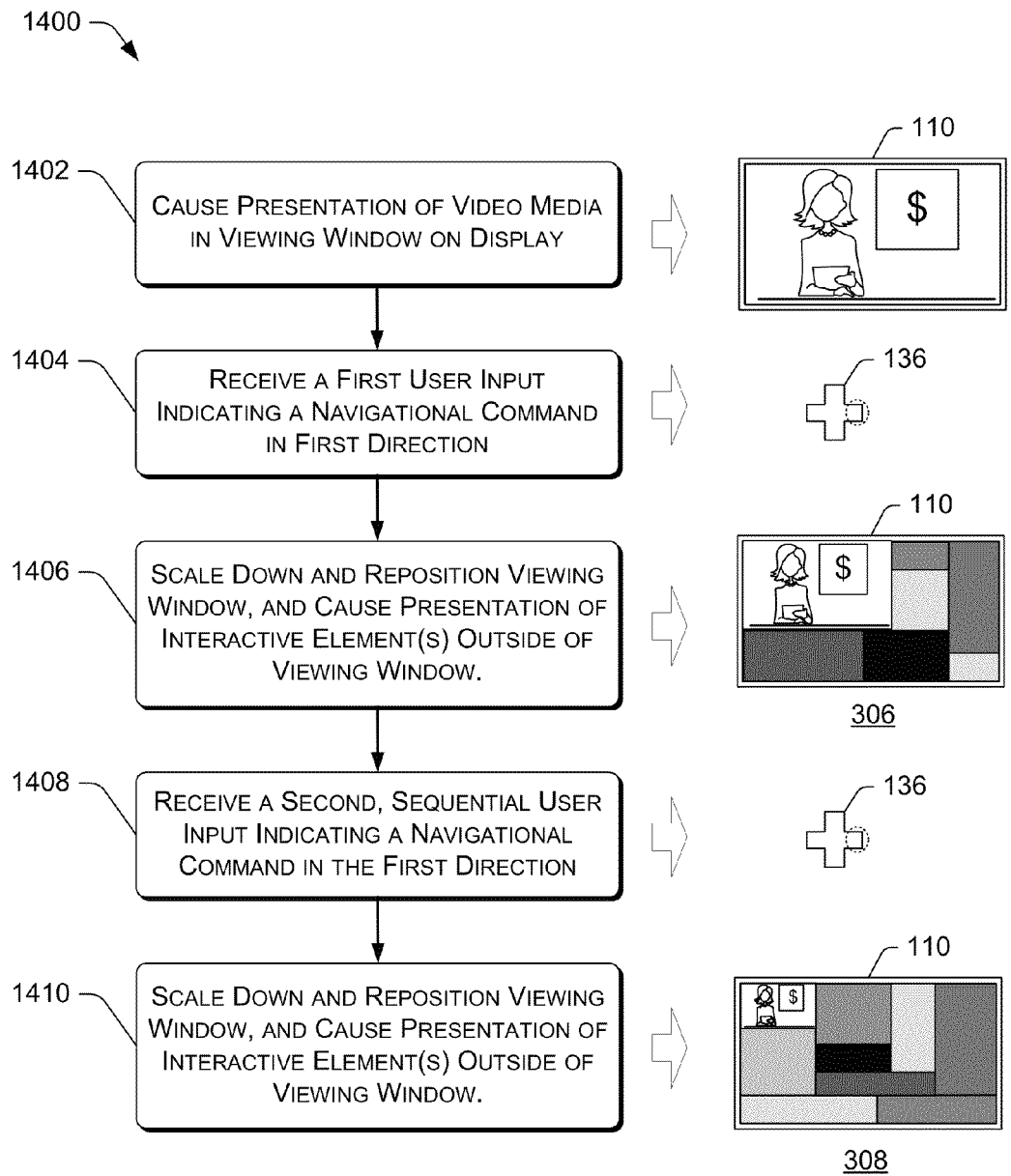
FIG. 14 is a flow diagram of an example process of progressively scaling and repositioning a video media viewport/window based on sequential navigational commands received via an input device.

FIG. 14 is a flow diagram of example process 1400 of progressively scaling and repositioning a video media viewport 106 based on sequential navigational commands received via an input device 132. The process is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Moreover, in some embodiments, one or more blocks of the process may be omitted entirely.

The process 1400 is described with reference to the architectures 100 and 200 of FIGS. 1 and 2. Particular reference may be made to the UI module 126, the input device 132, and the display 110, among other elements shown in FIG. 1.

At 1402, video media (e.g., broadcast television) may be presented on a display 110 within a viewing window on the display 110. In some embodiments, the viewing window may substantially span an entire area of the display 110. In other words, a full screen viewing state 302 may be invoked to present the video media full screen. This may be a default viewing state, such as when a user powers on the computing device 102 associated with the display 110.

At 1404, the computing device 102 may receive, during playback of the video media, a first user input via an input device 132 that indicates a navigational command in a first direction within a plane that is parallel to a front surface of the display 110. The diagram to the right of 1404 shows an example where user input may be provided via the directional pad 136 of the remote control 132(1). In this case, the user may press the rightmost portion of the directional pad 136 to indicate a rightward (i.e., positive X direction) navigational command within the plane that is parallel to the front surface of the display 110.

At 1406, in response to the first user input received at 1404, the UI module 126 scale down and positioned the center of video media viewport 106 on a portion of the display 110 that is a distance from the center of the display 110. In some embodiments, a component direction from the center of the display 110 to the position of the center of the scaled viewing window 106 may be different than (e.g., opposite) the first direction of the navigational command. For example, when the navigational command is in a rightward (i.e., positive X) direction in the plane of the display screen, the movement of the viewing window 106 may be in the leftward, upward, downward, and/or intermediate direction in the plane of the display screen. Furthermore, one or more interactive elements 108 may be presented outside of the scaled viewing window 106 at 1406. In some embodiments, the interactive element(s) 108 may surround the viewing window 106 on at least two sides of the viewing window 106. The interactive elements 108 may present contextual content that, in some instances, may relate to the video media program being played back in the viewing window 106.

At 1408, the computing device 102 may receive a second, sequential user input via an input device 132 that indicates a navigational command in the first direction (i.e., the same direction as the navigational command at 1404. The second user input at 1408 is received after the first user input such that the first and second user inputs make up a series of user inputs or a plurality of sequential user inputs that indicate navigational commands in the same direction.

At 1410, in response to the second user input received at 1408, the viewing window 106 that presents the video media may be scaled down even further and re-positioned on a portion of the display 110 that is in a direction from the center of the display 110 that is different than the first direction of the navigational command. Again, if the navigational command is in the rightward direction, the movement/repositioning of the viewing window 106 may be in the leftward, upward, downward, and/or intermediate direction in the plane of the display screen. Furthermore, one or more interactive elements 108 may be presented outside of the scaled viewing window 106 at 1410. In some embodiments, the interactive elements 108 may present content that corresponds to a different viewing experience than the viewing experience at 1406. That is, the interactive element(s) 108 presented on the display 110 at 1406 may include a different type of content (e.g., social-based content) than the content of the interactive element(s) 108 that are presented on the display 110 at 1410 (e.g., agent-based content).

The process 1400 allows the user of the computing device to navigate through a continuum 300 of viewing experiences so that she may immerse herself in a viewing experience of her choice. The dynamically changing display interfaces (e.g., display interfaces 306 and 308) progressively scale and reposition the video media viewport 106 in a manner that gives the user a sense of direction for intuitive navigation throughout the continuum 300.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example One

A computer-implemented method comprising: causing presentation of video media within a viewing window that substantially spans an area of a display; receiving a plurality of sequential user inputs (e.g., push button, touch screen, voice command, gestural (camera-based), etc.) that indicate a navigational command in a first direction (e.g., horizontal, vertical, or intermediate direction) within a plane that is substantially parallel to a front surface of the display; and in response to receiving the plurality of sequential user inputs: progressively scaling the viewing window to increasingly smaller size viewing windows based at least in part on individual ones of the sequential user inputs; positioning respective centers of the smaller size viewing windows at respective distances from a center of the display; and causing presentation, on the display, of one or more interactive elements outside of the smaller size viewing windows.

Example Two

The computer-implemented method of Example One, wherein the respective centers of the smaller size viewing windows are positioned in a direction from the center of the display having at least a component of the direction that is in a different (e.g., perpendicular/orthogonal, opposite, etc.) direction than the first direction of the navigational command.

Example Three

The computer-implemented method of the previous examples, alone or in combination, wherein the different direction is opposite the first direction.

Example Four

The computer-implemented method of the previous examples, alone or in combination, wherein the one or more interactive elements: are reflowed around the smaller size viewing windows, and present, or link (e.g., hyperlink) to, content that is related to the video media.

Example Five

The computer-implemented method of the previous examples, alone or in combination, further comprising: receiving a non-navigational user input (e.g., press of a "back button"); and in response to the receiving the non-navigational user input, reverting to causing presentation of the video media within the viewing window that substantially spans the area of the display.

Example Six

The computer-implemented method of the previous examples, alone or in combination, wherein the positioning comprises progressively positioning the smaller size viewing windows at increasingly greater distances from the center of the display.

Example Seven

The computer-implemented method of the previous examples, alone or in combination, further comprising: analyzing the video media during playback of the video media; and deriving content to be presented by the one or more interactive elements from the analyzing.

Example Eight

The computer-implemented method of the previous examples, alone or in combination, wherein the smaller size viewing windows and the one or more interactive elements displayed after each sequential user input are included within a modeless graphical user interface that is implemented as an application that presents, while allowing user interaction with, one of the smaller size viewing windows and the one or more interactive elements.

Example Nine

A system comprising: a display having a front surface, a center, and an area; an input device (e.g., a microphone, camera, remote control, etc.); one or more processors; and memory storing computer-executable instructions that, when executed by the one or more processors, cause the one or more processors to perform acts comprising: causing presentation of video media within a viewing window on the display; receiving a plurality of sequential user inputs (e.g., push button, touch screen, voice command, gestural (camera-based), etc.) via the input device that indicate a navigational command in a first direction (e.g., horizontal, vertical, or intermediate direction) within a plane that is substantially parallel to the front surface of the display; and in response to receiving the plurality of sequential user inputs: progressively scaling the viewing window to increasingly smaller size viewing windows based at least in part on individual ones of the sequential user inputs; positioning respective centers of the smaller size viewing windows at respective distances from the center of the display; and causing presentation, on the display, of one or more interactive elements outside of the smaller size viewing windows.

Example Ten

The system of Example Nine, wherein the respective centers of the smaller size viewing windows are positioned in a direction from the center of the display having at least a component of the direction that is in a different (e.g., perpendicular/orthogonal, opposite, etc.) direction than the first direction of the navigational command.

Example Eleven

The system of the previous examples, alone or in combination, wherein the different direction is opposite the first direction, and wherein the positioning comprises positioning the smaller size viewing windows in a corner of the display.

Example Twelve

The system of the previous examples, alone or in combination, further comprising an operating system agent stored in the memory and executable by the one or more processors to: analyze the video media during playback of the video media; and derive content to be presented by the one or more interactive elements based at least in part on analyzing the video media.

Example Thirteen

The system of the previous examples, alone or in combination, wherein the smaller size viewing windows and the one or more interactive elements are included within a modeless graphical user interface that is implemented as an application that presents, while allowing user interaction with, one of the smaller size viewing windows and the one or more interactive elements.

Example Fourteen

The system of the previous examples, alone or in combination, wherein the input device comprises a remote control having a directional pad, and the user inputs are received via the directional pad.

Example Fifteen

The system of the previous examples, alone or in combination, wherein the one or more interactive elements present, or link to, content that is related to the video media.

Example Sixteen

A computer-implemented method comprising: causing presentation of video media within a viewing window on a display; receiving a first user input (e.g., push button, touch screen, voice command, gestural (camera-based), etc.) that indicates a navigational command in a first direction (e.g., horizontal, vertical, or intermediate direction) within a plane that is substantially parallel to a front surface of the display; in response to receiving the first user input: scaling down the viewing window to a first reduced-size viewing window; positioning a center of the first reduced-size viewing window a first distance from a center of the display; and causing presentation, on the display, of one or more first interactive elements outside of the first reduced-size viewing window; receiving a second user input (e.g., push button, touch screen, voice command, gestural (camera-based), etc.) that indicates the navigational command in the first direction; and in response to receiving the second user input command: scaling down the first reduced-size viewing window to a second reduced-size viewing window; positioning a center of the second reduced-size viewing window a second distance from the center of the display; and causing presentation, on the display, of one or more second interactive elements outside of the second reduced-size viewing window.

Example Seventeen

The computer-implemented method of Example Sixteen, wherein the center of the first reduced-size viewing window is positioned in a direction from the center of the display that is different (e.g., perpendicular/orthogonal, opposite, etc.) than the first direction of the navigational command.

Example Eighteen

The computer-implemented method of the previous examples, alone or in combination, wherein the one or more first interactive elements present, or link (e.g., hyperlink) to, a first type of content, and the one or more second interactive elements present, or link to, a second type of content.

Example Nineteen

The computer-implemented method of the previous examples, alone or in combination, further comprising analyzing the video media during playback of the video media to derive content presented by the one or more first interactive elements or the one or more second interactive elements.

Example Twenty

The computer-implemented method of the previous examples, alone or in combination, wherein the first reduced-size viewing window and the one or more first interactive elements are included within a modeless graphical user interface that is implemented as an application that presents, while allowing user interaction with, the first reduced-size viewing window and the one or more first interactive elements.

Example Twenty-One

A system comprising: means for displaying video media, the means for displaying having a front surface, a center, and an area; means for receiving user input; means for executing computer-executable instructions (e.g., processors, including, for example, hardware processors such as central processing units (CPUs), system on chip (SoC), etc.); and means for storing computer-executable instructions (e.g., memory, computer readable storage media such as RAM, ROM, EEPROM, flash memory, etc.) that, when executed by the means for executing computer-executable instructions, cause performance of acts comprising: causing presentation of video media within a viewing window on the means for displaying; receiving a plurality of sequential user inputs (e.g., push button, touch screen, voice command, gestural (camera-based), etc.) via the means for receiving user input that indicate a navigational command in a first direction (e.g., horizontal, vertical, or intermediate direction) within a plane that is substantially parallel to the front surface of the means for displaying; and in response to receiving the plurality of sequential user inputs: progressively scaling the viewing window to increasingly smaller size viewing windows based at least in part on individual ones of the sequential user inputs; positioning respective centers of the smaller size viewing windows at respective distances from the center of the means for displaying; and causing presentation, on the means for displaying, of one or more interactive elements outside of the smaller size viewing windows.

Example Twenty-Two

The system of Example Twenty-One, further comprising means for analyzing the video media, the means for analyzing stored in the memory and executable by the means for executing computer-executable instructions to: analyze the video media during playback of the video media; and derive content to be presented by the one or more interactive elements based at least in part on analyzing the video media.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method comprising:
    causing presentation of video media within a viewing window that substantially spans an area of a display;
    receiving a plurality of sequential user inputs that indicate a navigational command in a first direction within a plane that is substantially parallel to a front surface of the display; and
    in response to receiving the plurality of sequential user inputs:
        progressively scaling the viewing window to increasingly smaller size viewing windows based at least in part on individual ones of the sequential user inputs;
        positioning respective centers of the smaller size viewing windows at respective distances from a center of the display; and
        causing presentation, on the display, of one or more interactive elements outside of the smaller size viewing windows.

2. The computer-implemented method of claim 1, wherein the respective centers of the smaller size viewing windows are positioned in a direction from the center of the display having at least a component of the direction that is in a different direction than the first direction of the navigational command.

3. The computer-implemented method of claim 2, wherein the different direction is opposite the first direction.

4. The computer-implemented method of claim 1, wherein the one or more interactive elements:
    are reflowed around the smaller size viewing windows, and
    present, or link to, content that is related to the video media.

5. The computer-implemented method of claim 1, further comprising:
    receiving a non-navigational user input; and
    in response to the receiving the non-navigational user input, reverting to causing presentation of the video media within the viewing window that substantially spans the area of the display.

6. The computer-implemented method of claim 1, wherein the positioning comprises progressively positioning the smaller size viewing windows at increasingly greater distances from the center of the display.

7. The computer-implemented method of claim 1, further comprising:
    analyzing the video media during playback of the video media; and
    deriving content to be presented by the one or more interactive elements from the analyzing.

8. The computer-implemented method of claim 1, wherein the smaller size viewing windows and the one or more interactive elements displayed after each sequential user input are included within a modeless graphical user interface that is implemented as an application that presents, while allowing user interaction with, one of the smaller size viewing windows and the one or more interactive elements.

9. A system comprising:
    a display having a front surface, a center, and an area;
    an input device;
    one or more processors; and
    memory storing computer-executable instructions that, when executed by the one or more processors, cause the one or more processors to perform acts comprising:
        causing presentation of video media within a viewing window on the display;

receiving a plurality of sequential user inputs via the input device that indicate a navigational command in a first direction within a plane that is substantially parallel to the front surface of the display; and in response to receiving the plurality of sequential user inputs:

progressively scaling the viewing window to increasingly smaller size viewing windows based at least in part on individual ones of the sequential user inputs;

positioning respective centers of the smaller size viewing windows at respective distances from the center of the display; and causing presentation, on the display, of one or more interactive elements outside of the smaller size viewing windows.

10. The system of claim 9, wherein the respective centers of the smaller size viewing windows are positioned in a direction from the center of the display having at least a component of the direction that is in a different direction than the first direction of the navigational command.

11. The system of claim 10, wherein the different direction is opposite the first direction, and wherein the positioning comprises positioning the smaller size viewing windows in a corner of the display.

12. The system of claim 9, further comprising an operating system agent stored in the memory and executable by the one or more processors to:

analyze the video media during playback of the video media; and derive content to be presented by the one or more interactive elements based at least in part on analyzing the video media.

13. The system of claim 9, wherein the smaller size viewing windows and the one or more interactive elements are included within a modeless graphical user interface that is implemented as an application that presents, while allowing user interaction with, one of the smaller size viewing windows and the one or more interactive elements.

14. The system of claim 9, wherein the input device comprises a remote control having a directional pad, and the user inputs are received via the directional pad.

15. The system of claim 9, wherein the one or more interactive elements present, or link to, content that is related to the video media.

16. A computer-implemented method comprising:

causing presentation of video media within a viewing window on a display;

receiving a first user input that indicates a navigational command in a first direction within a plane that is substantially parallel to a front surface of the display;

in response to receiving the first user input:

scaling down the viewing window to a first reduced-size viewing window;

positioning a center of the first reduced-size viewing window a first distance from a center of the display; and causing presentation, on the display, of one or more first interactive elements outside of the first reduced-size viewing window;

receiving a second user input that indicates the navigational command in the first direction; and in response to receiving the second user input command:

scaling down the first reduced-size viewing window to a second reduced-size viewing window;

positioning a center of the second reduced-size viewing window a second distance from the center of the display; and causing presentation, on the display, of one or more second interactive elements outside of the second reduced-size viewing window.

17. The computer-implemented method of claim 16, wherein the center of the first reduced-size viewing window is positioned in a direction from the center of the display that is different than the first direction of the navigational command.

18. The computer-implemented method of claim 16, wherein the one or more first interactive elements present, or link to, a first type of content, and the one or more second interactive elements present, or link to, a second type of content.

19. The computer-implemented method of claim 16, further comprising analyzing the video media during playback of the video media to derive content presented by the one or more first interactive elements or the one or more second interactive elements.

20. The computer-implemented method of claim 16, wherein the first reduced-size viewing window and the one or more first interactive elements are included within a modeless graphical user interface that is implemented as an application that presents, while allowing user interaction with, the first reduced-size viewing window and the one or more first interactive elements.

* * * * *